US012520051B2

(12) United States Patent
Zhu et al.

(10) Patent No.: US 12,520,051 B2
(45) Date of Patent: Jan. 6, 2026

(54) META-LENS ENABLED LIGHT-FIELD CAMERA WITH EXTREME DEPTH-OF-FIELD

(71) Applicants: University of Maryland, College Park, College Park, MD (US); Government of the United States of America as Represented by the Secretary of Commerce, Gaithersburg, MD (US)

(72) Inventors: Wenqi Zhu, Vienna, VA (US); Amit Kumar Agrawal, Rockville, MD (US); Lu Chen, Gaithersburg, MD (US); Henri J. Lezec, Silver Spring, MD (US)

(73) Assignee: University of Maryland, College Park, College Park, MD (US)

( * ) Notice: Subject to any disclaimer, the term of this patent is extended or adjusted under 35 U.S.C. 154(b) by 199 days.

(21) Appl. No.: 18/181,966

(22) Filed: Mar. 10, 2023

(65) Prior Publication Data
US 2023/0292016 A1    Sep. 14, 2023

Related U.S. Application Data

(60) Provisional application No. 63/269,233, filed on Mar. 11, 2022.

(51) Int. Cl.
*H04N 23/95* (2023.01)
*H04N 13/232* (2018.01)
(Continued)

(52) U.S. Cl.
CPC ......... *H04N 23/957* (2023.01); *H04N 13/232* (2018.05); *H04N 23/55* (2023.01)

(58) Field of Classification Search
CPC .............................. H04N 23/67; H04N 23/95
(Continued)

(56) References Cited

U.S. PATENT DOCUMENTS

2019/0113885 A1*   4/2019  Arbabi .................... G03H 1/06
2021/0037219 A1    2/2021  Colburn et al.
(Continued)

FOREIGN PATENT DOCUMENTS

CN           114755800 A  *  7/2022   ............. G02B 1/007

OTHER PUBLICATIONS

Qin et al., Active Modulating the Intensity of Bifocal Metalens with Electrically Tunable Barium Titanate (BTO) Nanofins, Aug. 2021, nanomaterials (Year: 2021).*
(Continued)

*Primary Examiner* — Anthony J Daniels
(74) *Attorney, Agent, or Firm* — Quarles & Brady LLP; Yakov S. Sidorin

(57) ABSTRACT

A chiral light-field optical imaging camera incorporating an array of photonic spin-multiplexed bifocal metalenses. Combined with a novel deep learning-based neural network reconstruction algorithm, the system provides distinct aberration-free photographic capabilities, including the ability to achieve a polarization controllable extremely large depth-of-field optical imaging across a range of distances within a range covering at least five orders of magnitude in absence of moving a part of the camera and based on a single exposure of an optical detector while maintaining high spatial lateral resolution.

18 Claims, 22 Drawing Sheets
(22 of 22 Drawing Sheet(s) Filed in Color)

(51) Int. Cl.
   *H04N 23/55*    (2023.01)
   *H04N 23/67*    (2023.01)
   *H04N 23/957*   (2023.01)

(58) Field of Classification Search
   USPC .......................................................... 348/345
   See application file for complete search history.

(56) References Cited

U.S. PATENT DOCUMENTS

2021/0080543 A1* 3/2021 Ohno .................... G03B 17/02
2024/0147032 A1* 5/2024 Miyata ..................... G06N 3/02
2024/0334033 A1* 10/2024 Brand ....................... G06T 7/55

OTHER PUBLICATIONS

Colburn, S. et. al.; "Metasurface optics for full-color computational imaging" Sci. Adv. 4, eaar2114 (2018). 6 pages.
Tseng, E. et. al.; "Neural nano-optics for high-quality thin lens imaging." Nat. Commun. 12, 6493 (2021). 7 pages.
Veeraraghavan, Ashok, et. al. "Dappled photography: Mask enhanced cameras for heterodyned light fields and coded aperture refocusing." ACM Trans. Graph. 26.3 (2007). 14 pages.
Ihrke, Ivo, et. al., "Principles of light field imaging: Briefly revisiting 25 years of research." IEEE Signal Processing Magazine 33.5 (2016). 59-69; 17 pages.
Lumsdaine, et. al., "The focused plenoptic camera." 2009 IEEE international conference on computational photography (ICCP). IEEE, 2009.
Perwass, Christian, et. al., "Single lens 3D-camera with extended depth-of-field." Human vision and electronic imaging XVII. vol. 8291. SPIE, 2012.
Wu, Gaochang, et. al., "Light field image processing: An overview." IEEE Journal of Selected Topics in Signal Processing 11.7 (2017): 926-954.
Blain, Loz, et. al., "Record-breaking camera keeps everything between 3 cm and 1.7 km in focus" Apr. 29, 2022, Retrieved on Aug. 16, 2024, from https://newatlas.com/photography/nist-light-field-camera-record-depth-of-field/, 10 pages.
Fan, Qingbin, et. al., "Trilobite-inspired neural nanophotonic light-field camera with extreme depth-of-field" Apr. 19, 2022, Retrieved on Aug. 16, 2024, from nature.com/articles/s41467-022-29568-y, 30 pages.

* cited by examiner

FIG. 1A
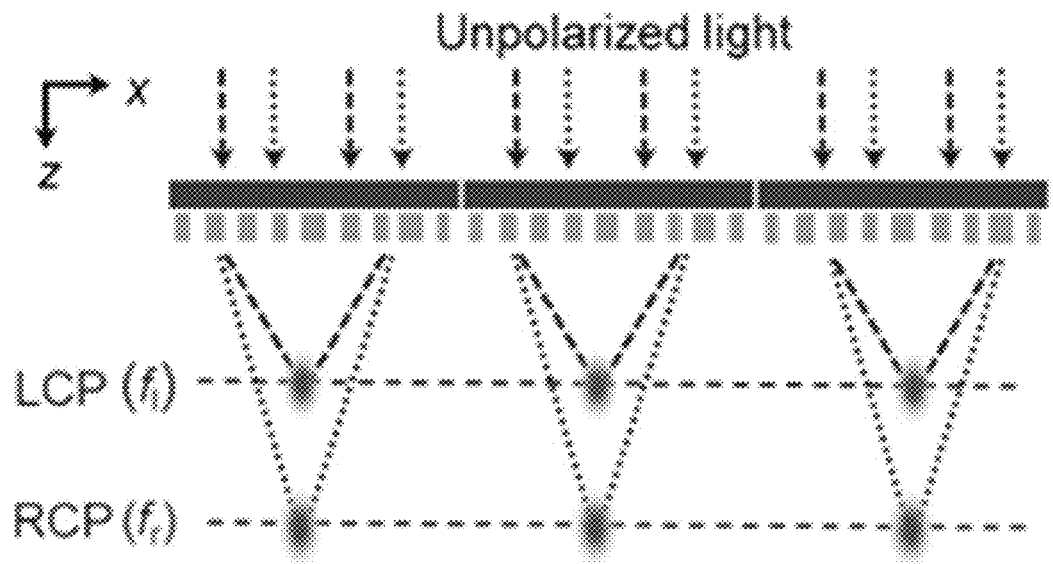
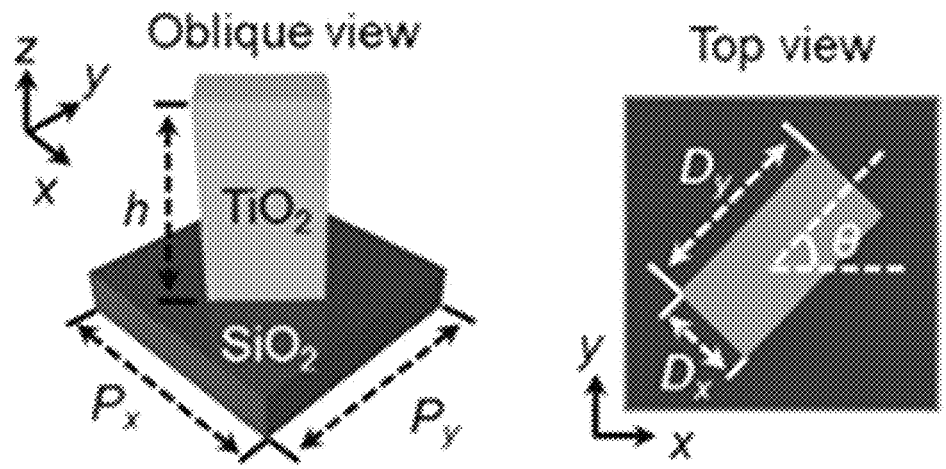

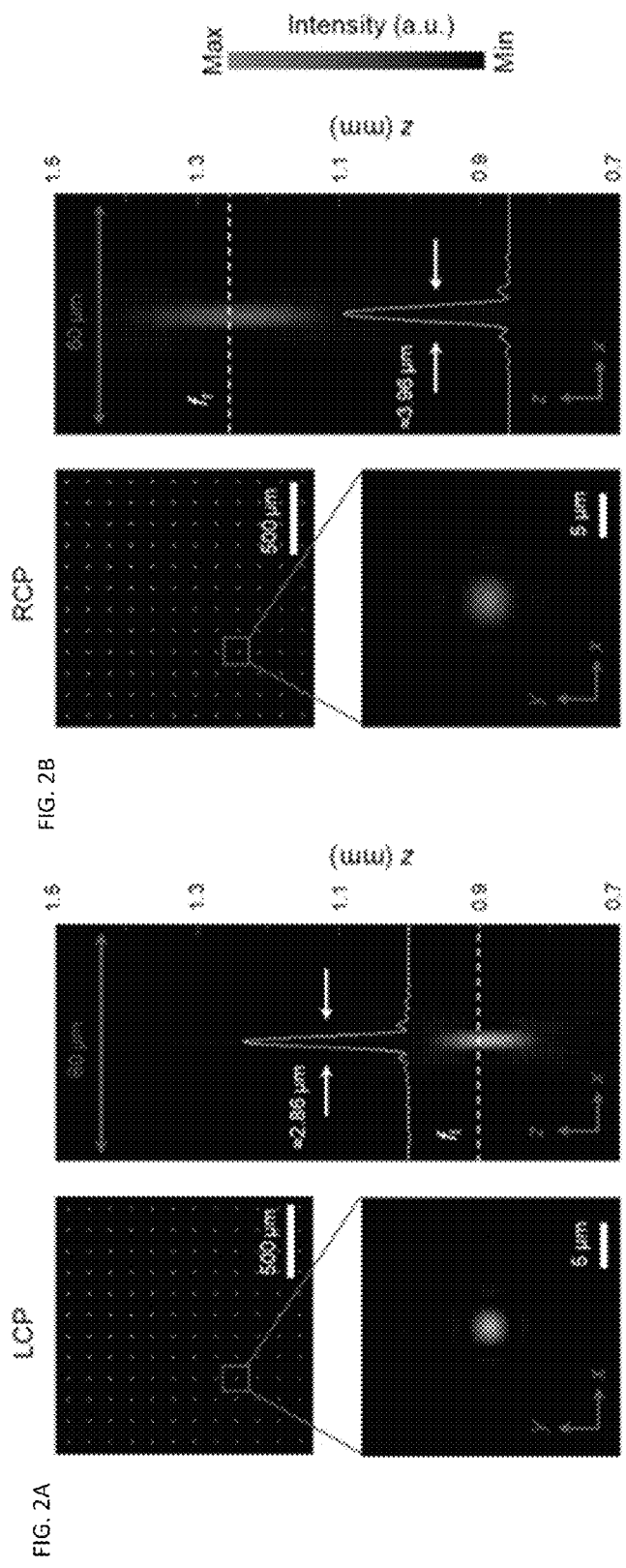
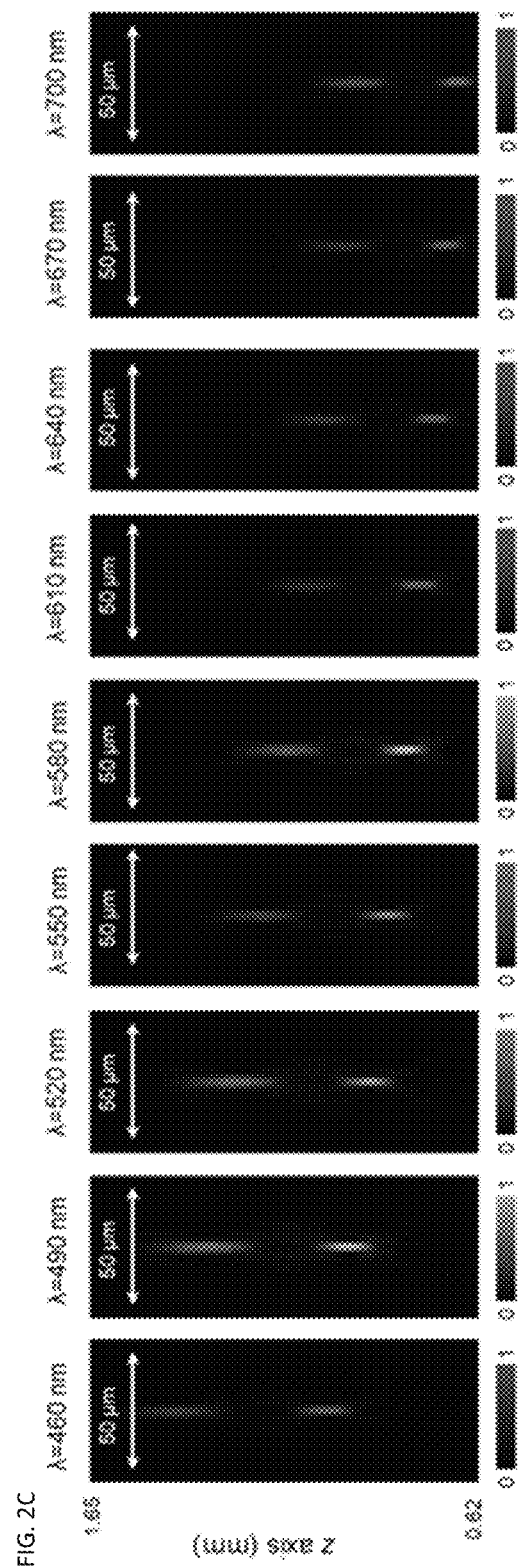
FIG. 2A
FIG. 2B
FIG. 2C

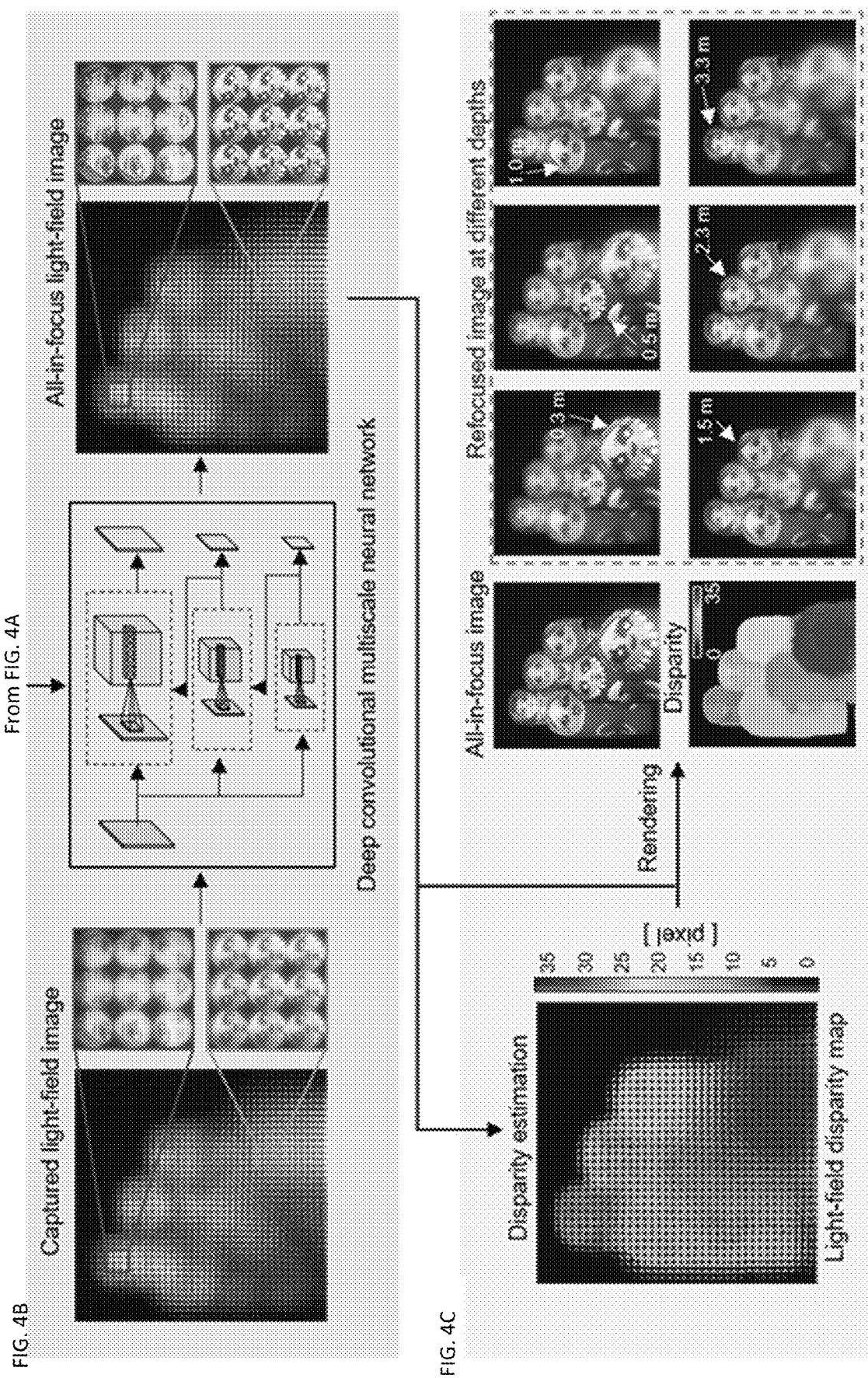

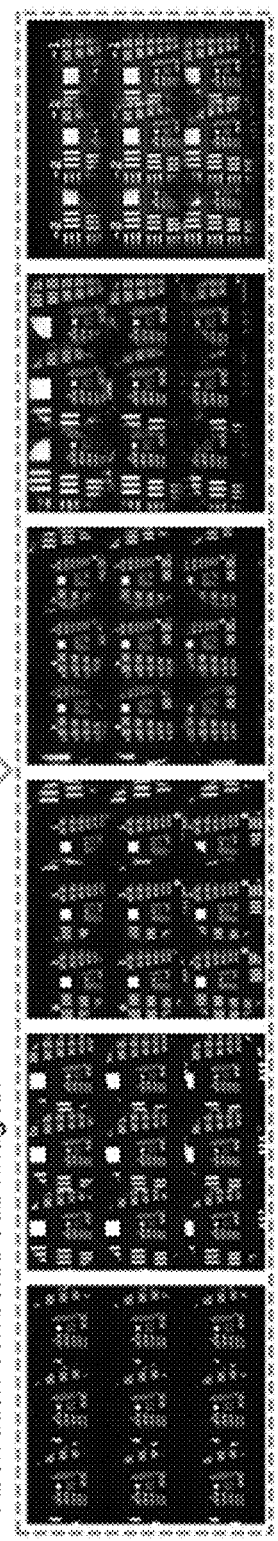
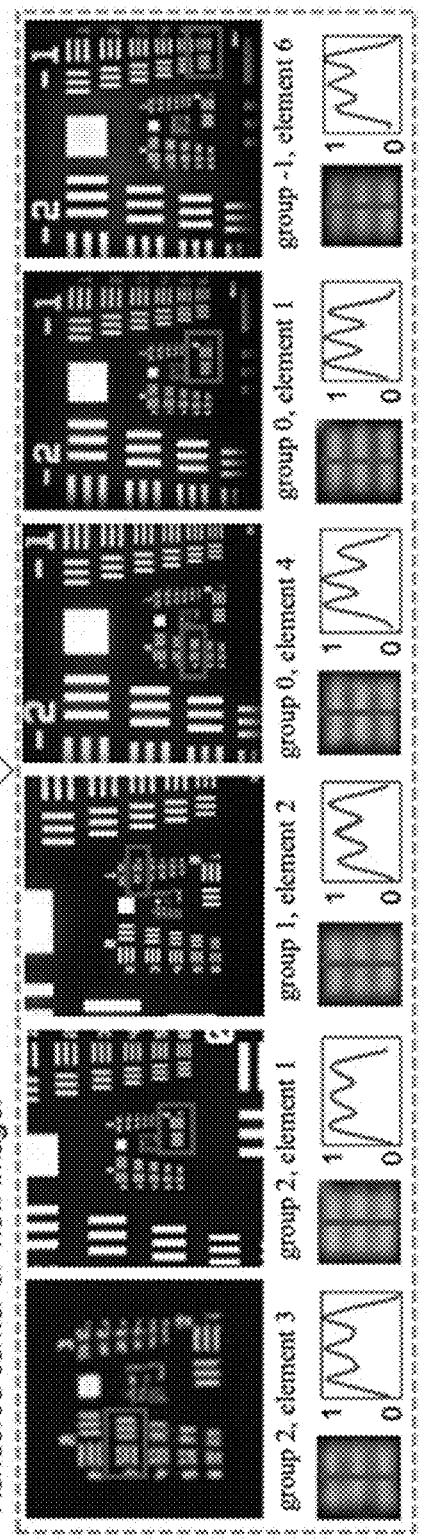
FIG. 5A Captured light-field sub-images:
FIG. 5B Aberration corrected sub-images:
FIG. 5C Rendered center-of-view image:

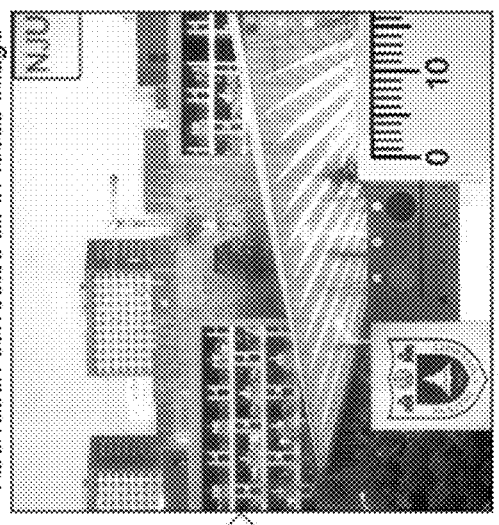
FIG. 6A Captured light-field sub-images
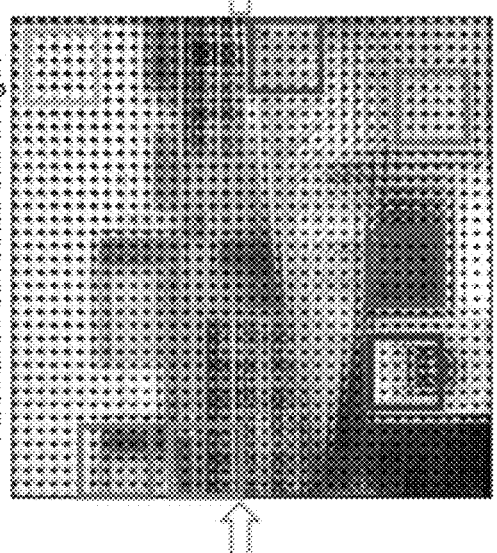
FIG. 6B Aberration corrected sub-images
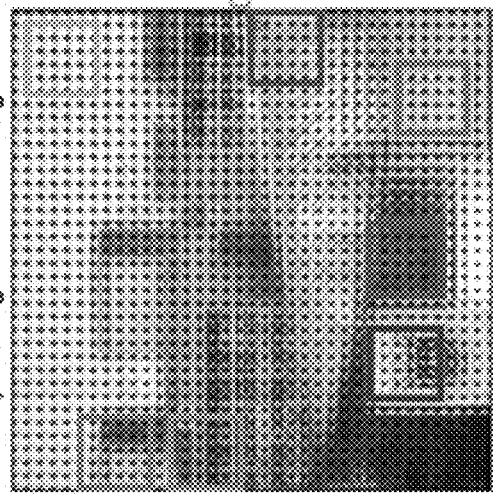
FIG. 6E Aberration corrected all-in-focus image
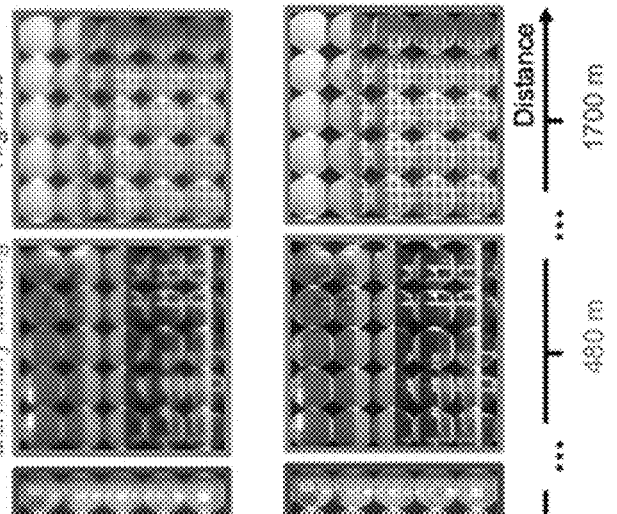
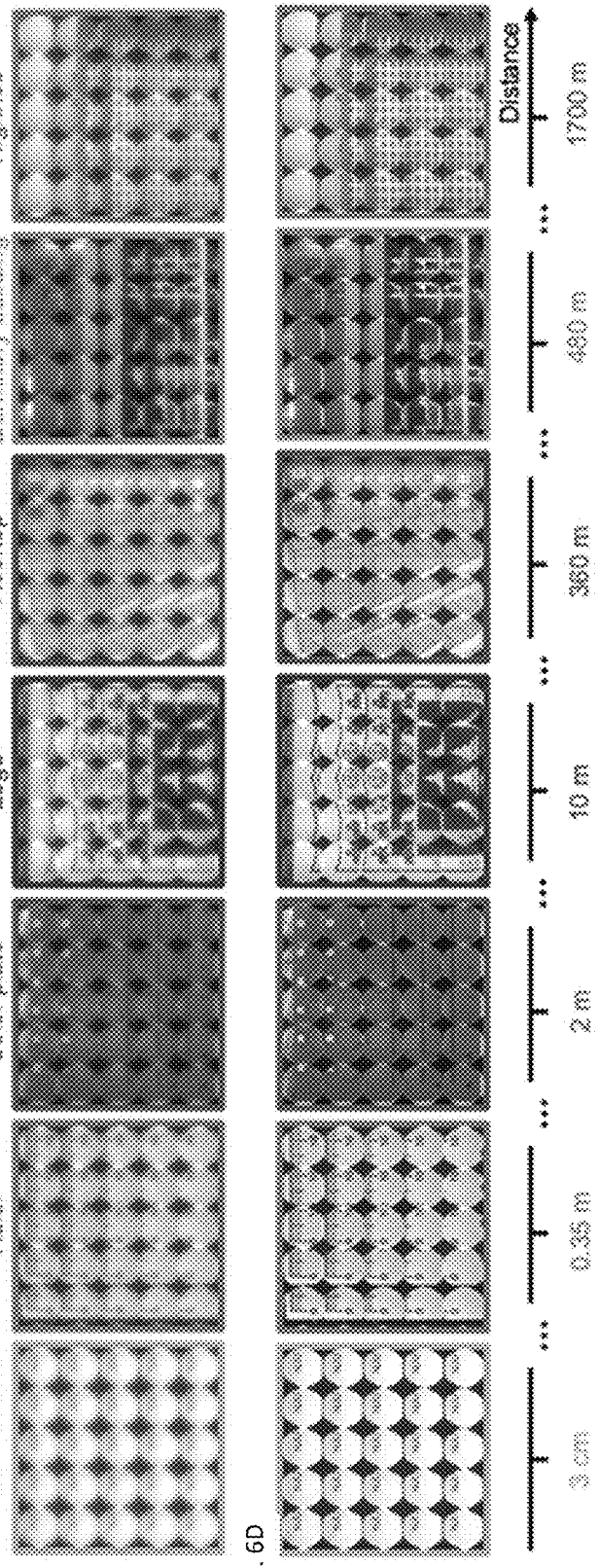
FIG. 6C
FIG. 6D FIG. 8
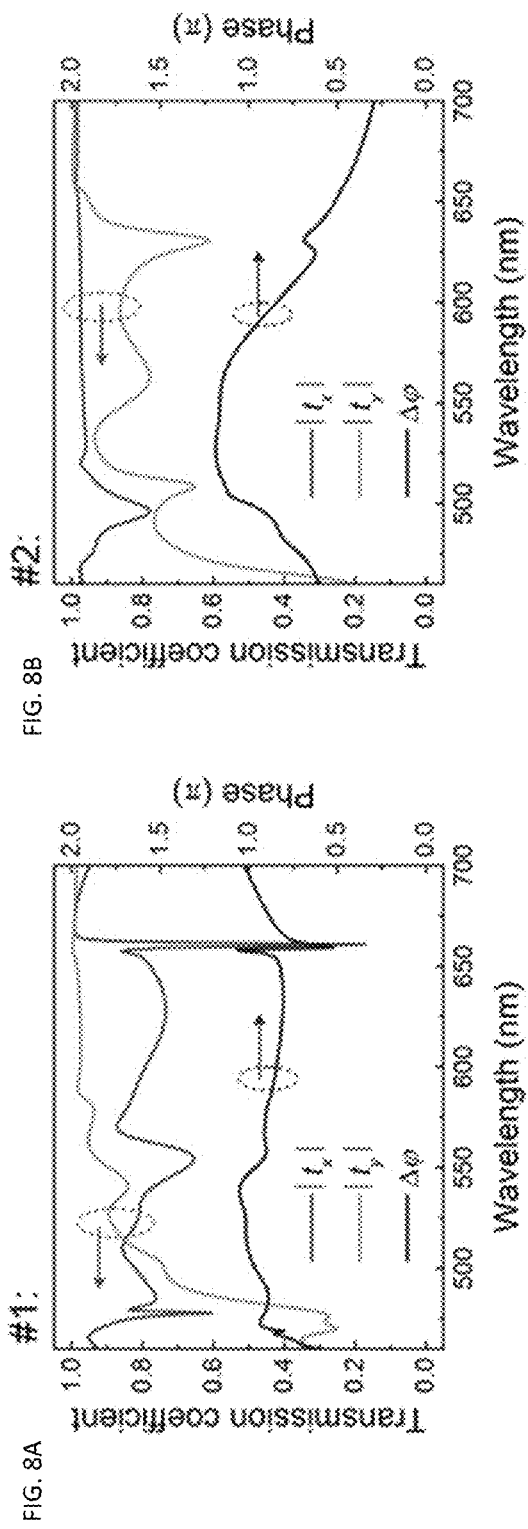
FIG. 8A
FIG. 8B
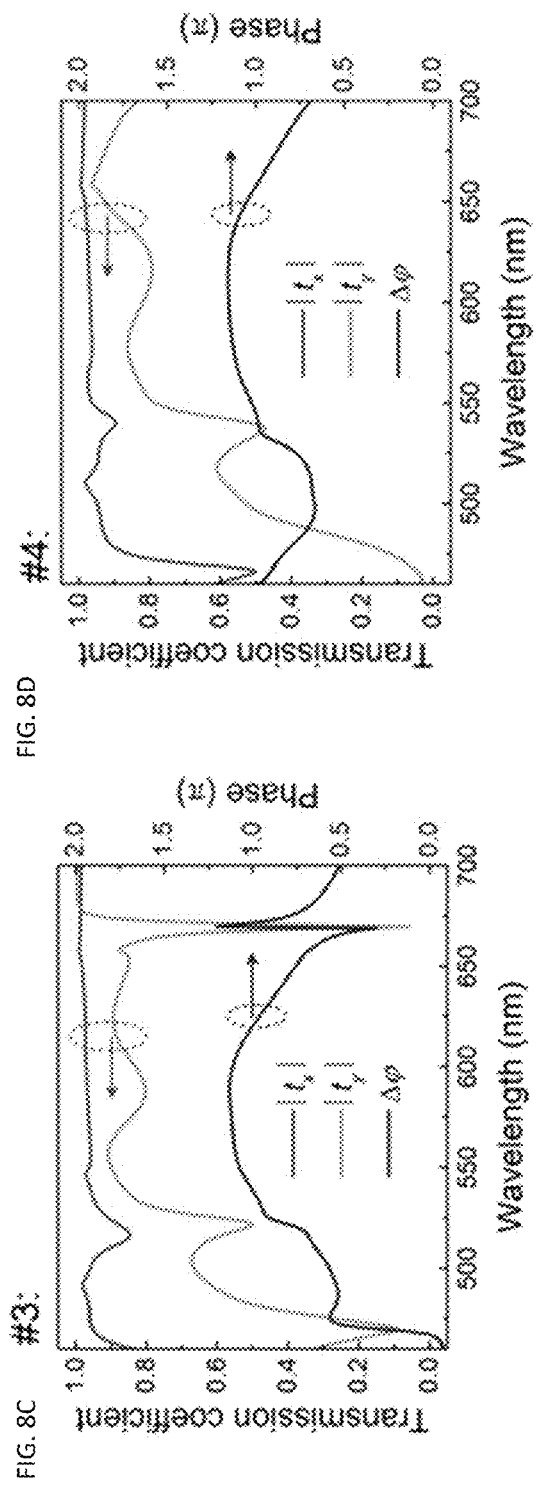
FIG. 8C
FIG. 8D

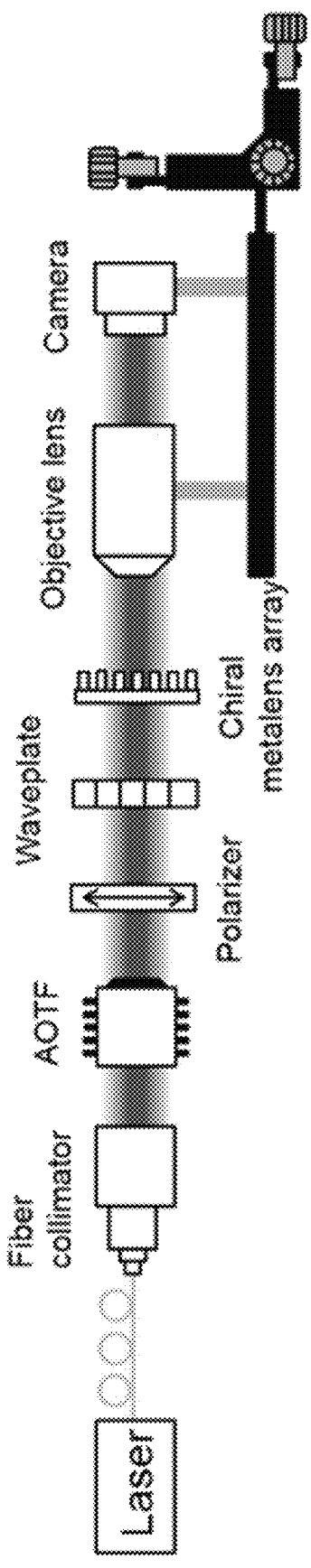
FIG. 9A
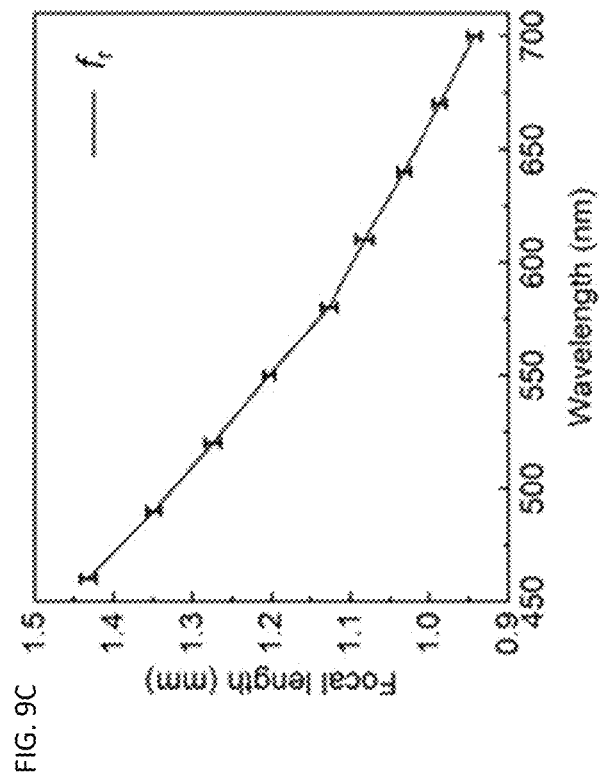
FIG. 9C
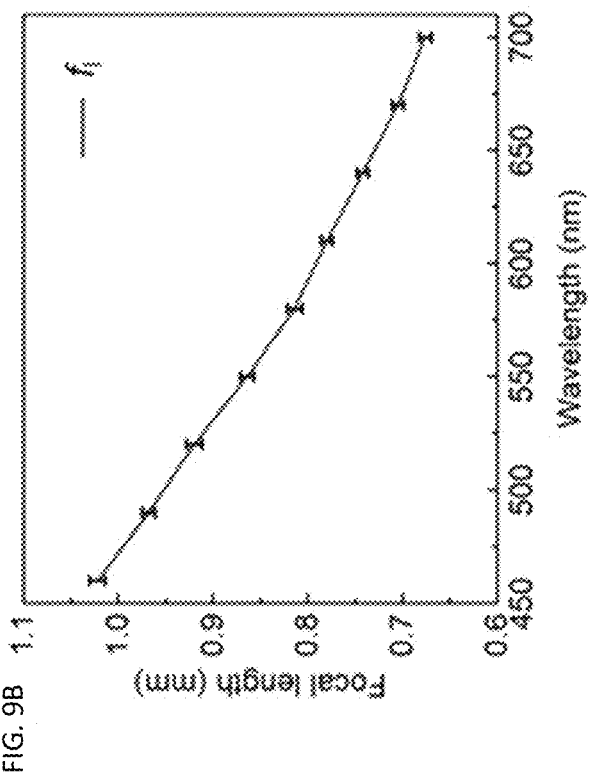
FIG. 9B
FIG. 9

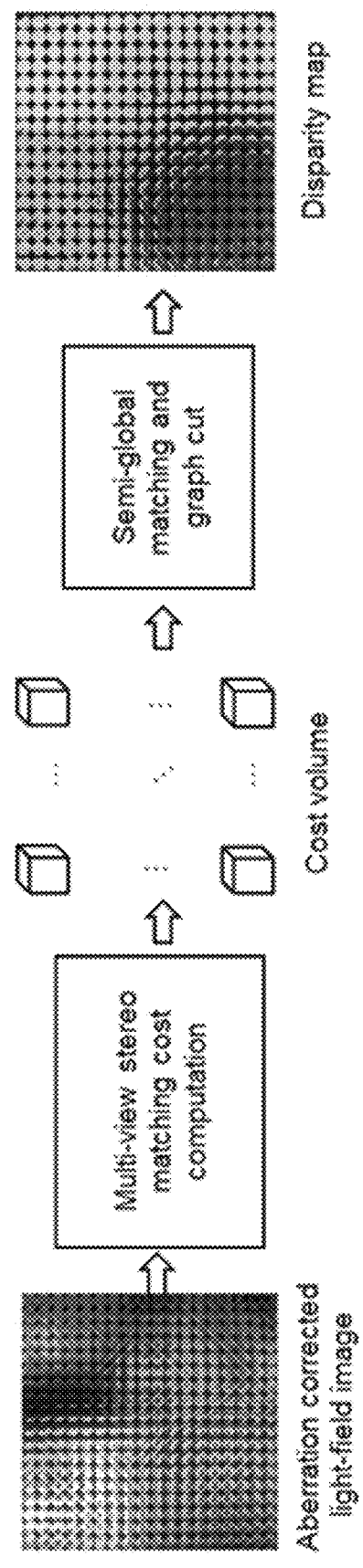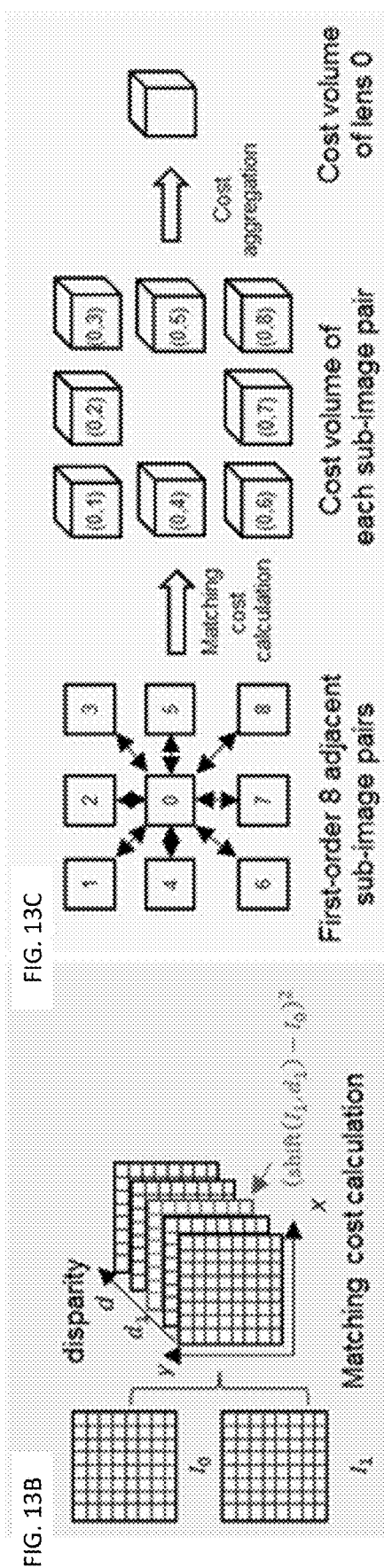
FIG. 13
FIG. 13A
FIG. 13B
FIG. 13C

FIG. 15
FIG. 15A
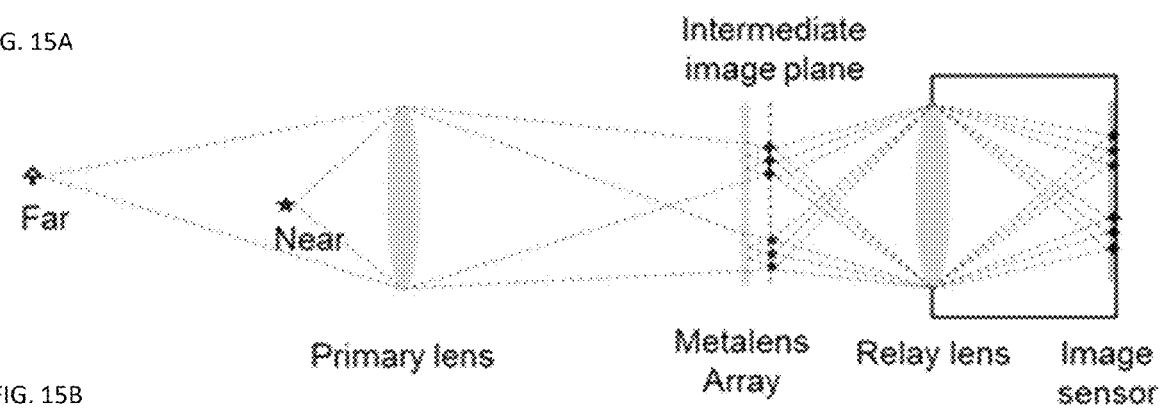
FIG. 15B
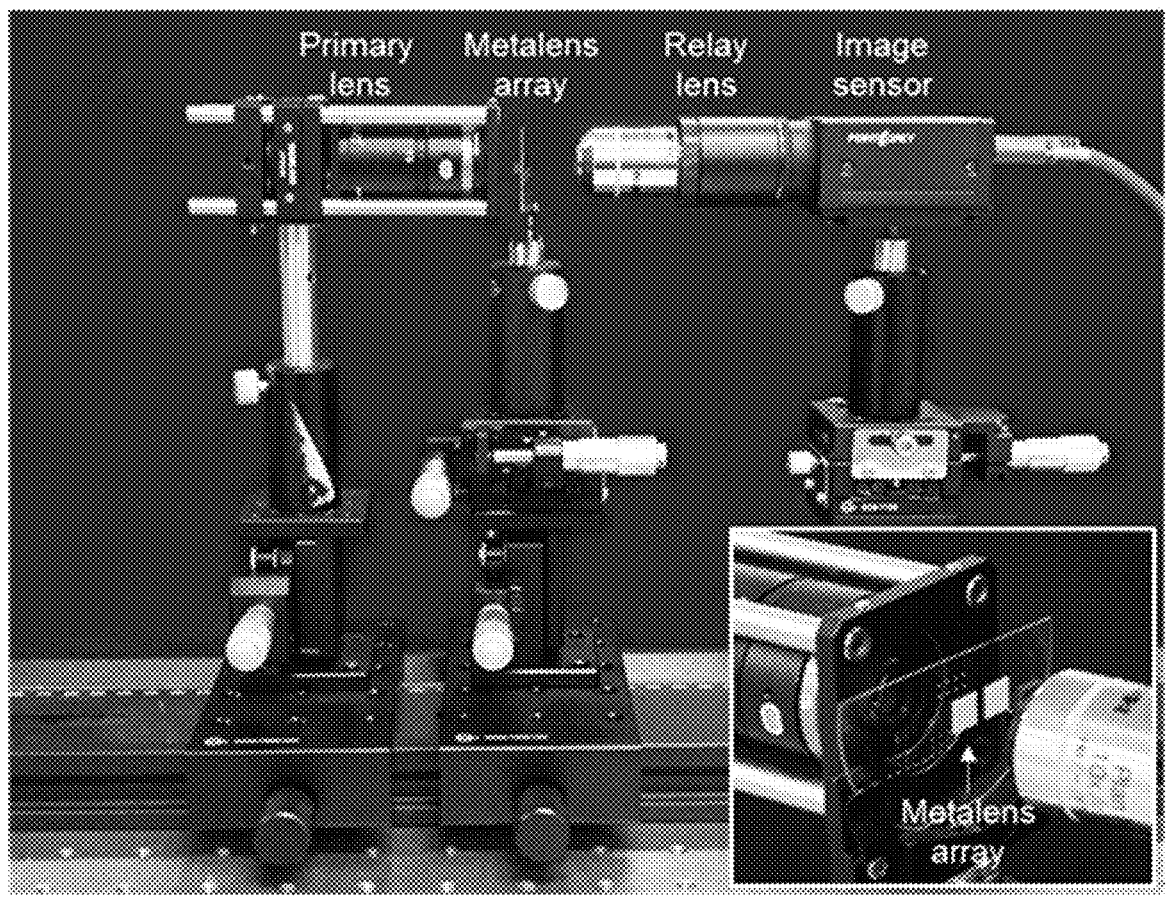

FIG. 16
FIG. 16A
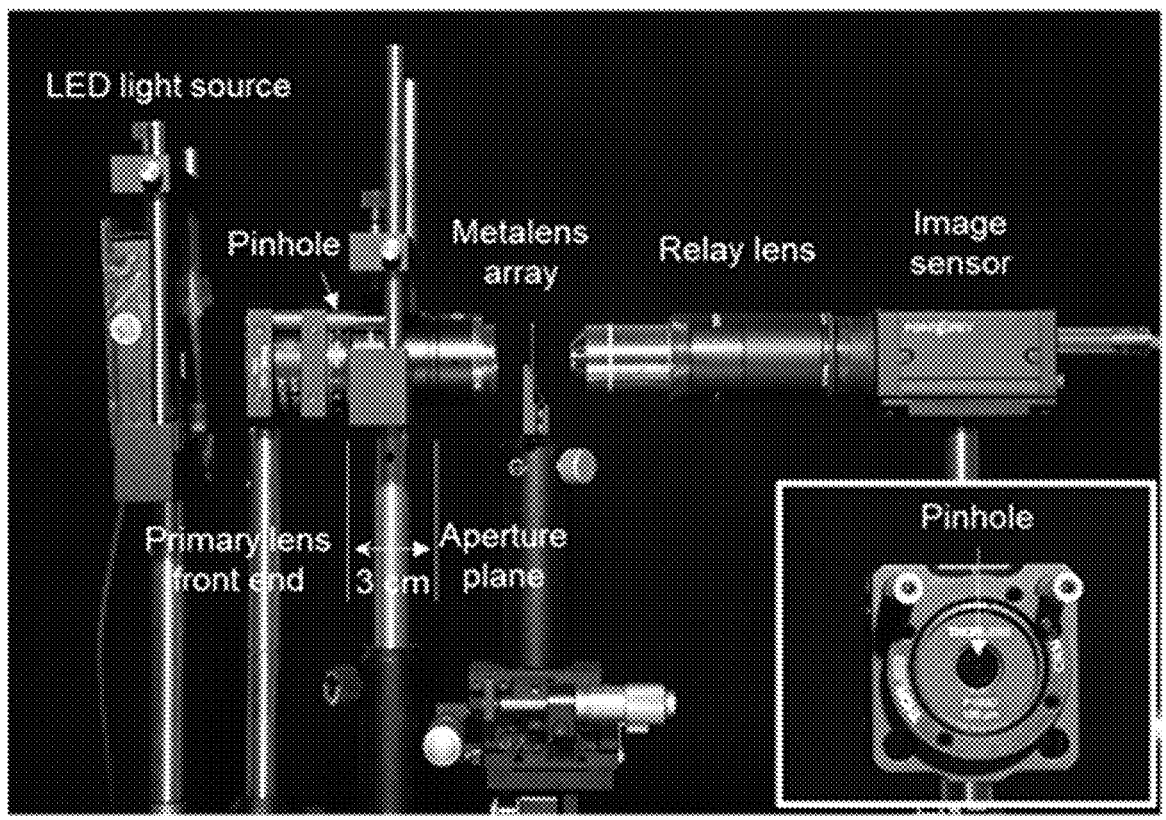
FIG. 16B
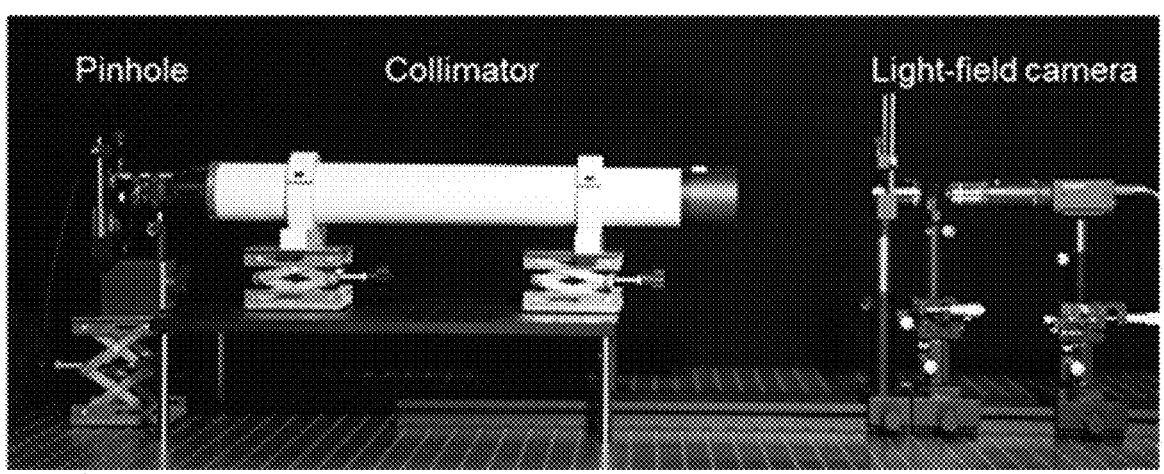

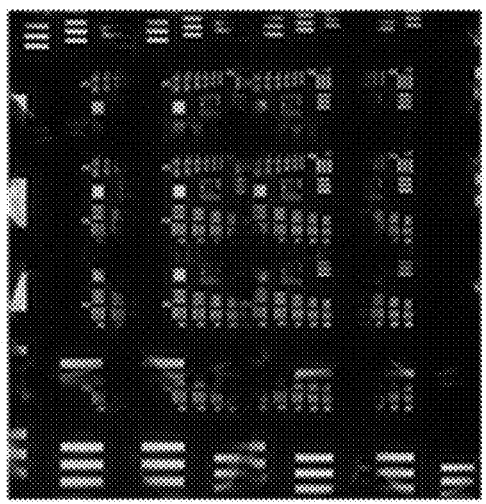
FIG. 18E
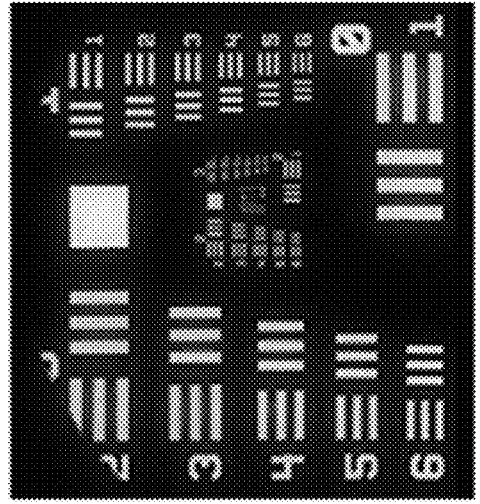
FIG. 18F
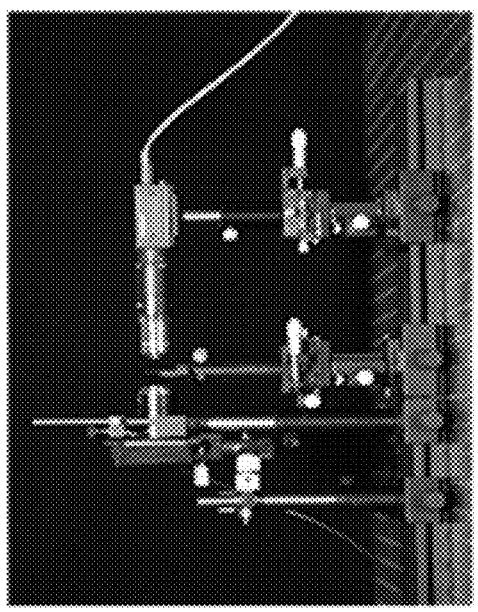
FIG. 18B
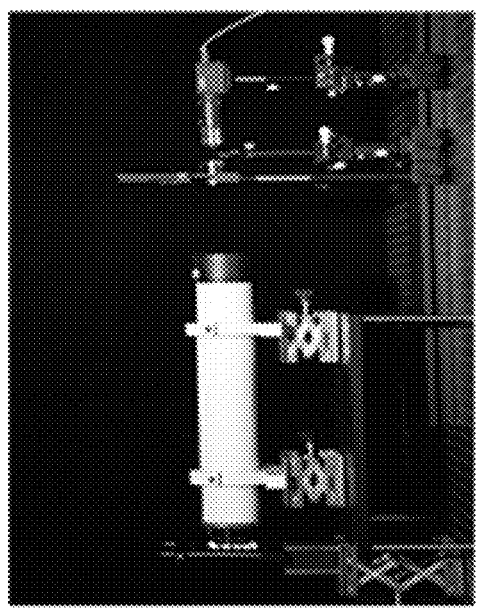
FIG. 18D
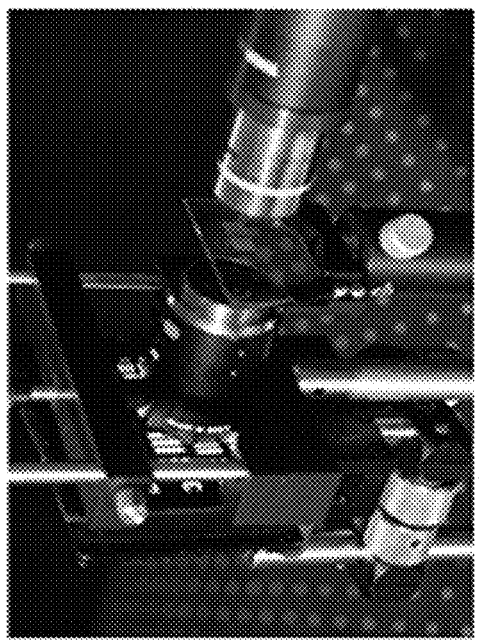
FIG. 18A
FIG. 18C
FIG. 18

FIG. 20
| FIG. 20A LCP | FIG. 20B RCP | FIG. 20C Natural light |
|---|---|---|
|  | 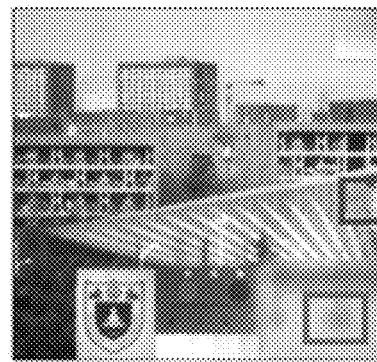 | 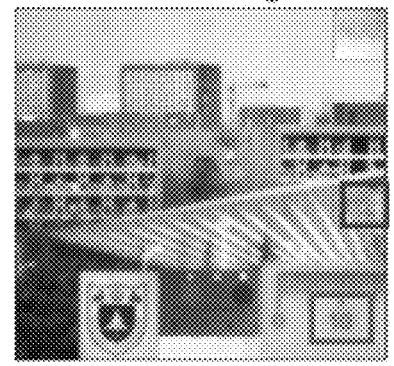 |
| 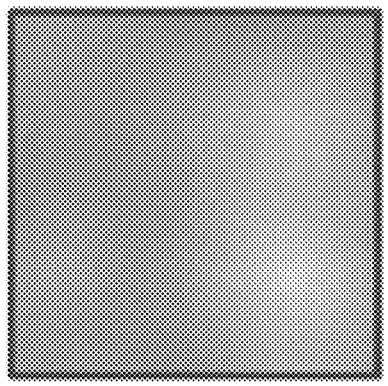 | 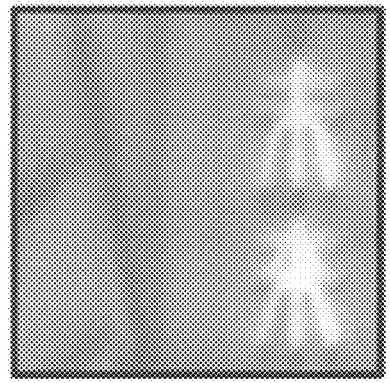 | 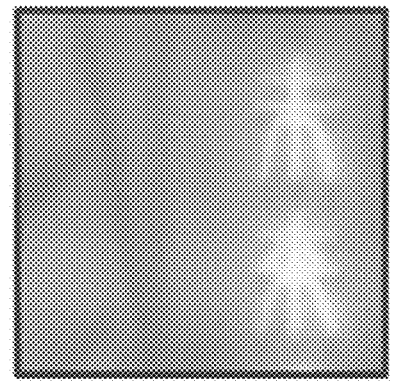 |
| 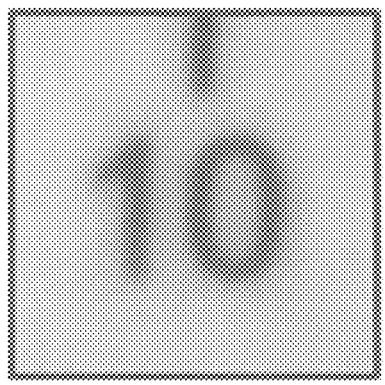 | 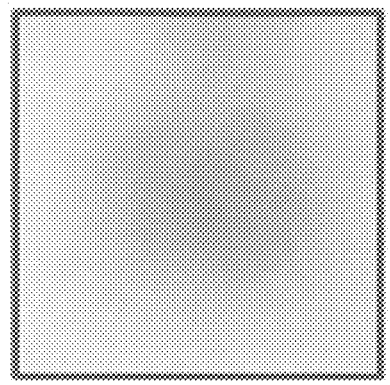 | 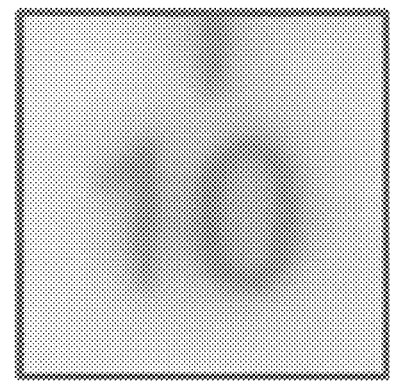 |

META-LENS ENABLED LIGHT-FIELD CAMERA WITH EXTREME DEPTH-OF-FIELD

CROSS-REFERENCE TO RELATED APPLICATIONS

This application claims the benefit of U.S. Provisional Patent Application No. 63/269,233 filed on Mar. 11, 2022, the entire contents of which are incorporated by reference herein, for all purposes.

STATEMENT REGARDING FEDERALLY SPONSORED RESEARCH OR DEVELOPMENT

This invention was made jointly at the University of Maryland and at the National Institute of Standards and Technology (NIST) with government support under Grant Number 70NANB14H209 awarded by the National Institute of Standards and Technology (NIST). The U.S. government has certain rights in the invention.

TECHNICAL FIELD

The present invention relates to plenoptic optical imaging and, more particularly, to acquisition of plenoptic optical images of the object space at any and every point across a depth-of-field continuously ranging from a centimeter-like distance to a kilometer-scale distance implemented with a use of a judiciously configured chiral metalens, which acquisition turns on a single, the only exposure of the optical detector of the plenoptic camera utilizing such chiral lens in absence of repositioning of a portion of the camera.

RELATED ART

A light-field camera (LFC, also known in related art as a plenoptic camera or plenoptic imaging system or apparatus, which terms are usually used interchangeably in related art) is an optical imaging system or apparatus that captures information about not only the light field emanating from a scene (for example, the intensity of light in a scene) but also the precise direction along which the light is propagating in space, as known in related art. This contrasts the LFC with a conventional optical imaging camera, which records only light intensity at various wavelengths.

One conventional type of the LFC utilizes an array of micro-lenses placed in front of an otherwise conventional image sensor to sense intensity, color, and directional information. (Multi-camera arrays can be considered to be another type, of the LFC.) In 2004, it was shown that images acquired with the micro-lens array employing LFC can be refocused after they are taken (see graphics.stanford.edu), implying that "standard plenoptic camera" may be intended for close-range applications as it exhibits increased depth resolution at distances that can be metrically predicted based on the camera's parameters. The following modification of the design in which the micro-lens array was positioned before or behind the focal plane of the main lens allowed to sample the light field in a way that traded angular resolution for higher spatial resolution, notwithstanding the fact that the lower angular resolution was likely to introduce aliasing artifacts. Yet another step was taken when a low-cost printed film mask instead of a microlens array was employed (see Ashok Veeraraghavan, et al., "Dappled Photography: Mask Enhanced Cameras for Heterodyned Light Fields and Coded Aperture Refocusing", in *ACM Transactions on Graphics*, Vol. 26, Issue 3, July 2007). This design reduced the chromatic aberrations and loss of boundary pixels seen in microlens arrays, and allowed for greater spatial resolution at the expense of reduction of the amount of light that reaches the image sensor, thereby reducing brightness of the final images.

Notably, the currently conventional micro-lens-array-employing LFCs are configured to vary—albeit in a rather limited range—the depth of field (DOF; or viewed alternatively—a depth of focus, as a skilled artisan will readily appreciate) of a 2-dimensional representation of a taken image to be adjusted after a picture has been taken with the use of the so-called Lytro's algorithm, known in the art. A user can "refocus" a given physically acquired 2D image at a rather limited range of particular distances for artistic effects and effectively extend the refocusable range within the corresponding limited boundaries, but the latter necessarily requires the need to necessarily physically capture several (3 or 5, for example) consecutive images at different DOFs. Further, achieving enlarged DOF without compromising spatial resolution remains a challenge in light-field (plenoptic) optical imaging.

SUMMARY OF THE INVENTION

Embodiments provide an article of manufacture that includes at least a chiral metalens containing an array of pluralities of spatially-limited material elements. Each plurality is configured to converge a substantially planar wavefront of unpolarized light incident thereon to a first focal point for a first state of polarization and to a second focal point for a second state of polarization (the first and second states of polarizations being orthogonal to one another, the first focal point being spatially different from the second focal point). Optionally but not necessarily, each of the spatially-limited material elements is configured as a half-wave plate for each of the first and second states of polarization and/or each of the spatially-limited material elements is shaped as a pillar protruding from a surface of said optical substrate. Alternatively or in addition, all of the first focal points are in a first focal plane and each of the second focal points are in the second focal plane, the first and second focal planes being substantially parallel to one another. Substantially in every implementation of the article, the article may additionally include a primary lens axially separated from the chiral metalens and co-axial with the chiral metalens (here, a combination of the primary lens and the chiral metalens is configured as a bi-focal light-field optical imaging system defining an imaging plane). Furthermore, substantially in every implementation of the article of manufacture, alternatively or in addition, at least one of the two structural conditions may be satisfied: a first structural condition manifesting in that the primary lens includes more than one lens element (which, when present, are substantially co-axial with one another) and a second structural conditions manifesting in that the article of manufacture further comprises a relay optics positioned at the imaging plane and configured to define a final imaging plane. Notably, the article of manufacture is configured such that the bi-focal light-field optical imaging system, in operation, forms either in the imaging plane (or when the second structural conditions is satisfied—in the final imaging plane) both first multiple images of a first portion of an object space only with the use of a first component of unpolarized light incident onto such combination and second multiple images of a second portion of the object space only with the use of a second component of the unpolarized light incident onto the combination (here, the first component has the first state of polarization and the second component has the second state of polarization and/or the first portion of the object space and the second portion of the object space are necessarily different from one another). At least when the article of manufacture is so configured, at least one of the following conditions may be satisfied: (a) when the unpolarized light is substantially monochromatic, the first portion of the object space is optically conjugate with the image plane and is axially separated from the combination by a first distance while the second portion of the object space is optically conjugated with the image plane axially separated from the combination by a second distance, the first and second distances being necessarily different from one another, and (b) when the unpolarized light is substantially polychromatic, at least a part of the first portion of the object space and/or at least a part of the second portion of the object space is not optically conjugate with the image plane in light at one of multiple wavelengths present in the unpolarized light. Alternatively or in addition, and substantially in every implementation of the article of manufacture containing the bi-focal spin-multiplexed light-field optical imaging system, such light-field optical imaging system may be structured (i) to form the first multiple images with the use of only substantially a half of a first fraction of the unpolarized light that has the first state of polarization while converging the other half of said first fraction to a first plane different from the imaging plane and (ii) to form the second multiple images with the use of only substantially a half of a second fraction of the unpolarized light that has the second state of polarization while converging the other half of said second fraction to a second plane different from the imaging plane. (Here, the first and second plane are axially separated from one another by the imaging plane.) Alternatively or in addition, and substantially in every implementation of the article that include the bi-focal spin-multiplexed optical imaging system, such optical imaging system may be—and preferably is—configured to form the first and second multiple images in a single exposure of an optical detector of the optical imaging system and necessarily without at least axial (and, generally, any) repositioning of an optical component of the optical imaging system. In at least one specific case, an F-number of the primary lens is not smaller than an F-number of the chiral metalens to avoid spatial overlap of multiple images at the imaging plane and/or the F-number of the primary lens is not smaller than an F-number of the chiral metalens corresponding to a longer of a first focal length and a second focal length of the chiral metalens.

An implementation of the article of manufacture may additionally include a programmable processor (a) that is configured to transform optical data acquired by an optical detector positioned in the image plane or, when the second structural condition is satisfied, in the final image plane to determine a spatial characteristic and/or a spectral characteristic of a third portion of the object space that is not optically conjugate with the image plane based at least on values of a point spread function (PSF) of the bi-focal optical imaging system empirically determined at multiple wavelengths for a multiplicity of different object distances for each of the first and second states of polarization; and/or (b) that is configured to determine said spatial and/or spectral characteristic of the third portion of the object space that is separated from the combination by a distance within a range spanning at least five orders of magnitude or longer. Here, a lower limit of the range is about a centimeter and/or an upper limit of the range is about 10 kilometers. The programmable processor may be additionally configured: to transform optical images represented by the optical data to correct the optical images for aberrations including at least third order aberrations and chromatic aberrations, and/or to transform the optical images to estimate disparity thereof and/or to perform refocusing of the optical images at different depths of field, and/or to transform the optical images by spatially stitching different of said optical images with one another, thereby generating output images that are substantially fully focused for each depth of field corresponding to each distance in the range or generating output images selectively focused at specific depths of field corresponding to specific distances in such range or providing ranging functionality of the article of manufacture.

Embodiments additionally provide a method that includes at least a step of converging a first portion of light having the first polarization to a first point and converging a second portion of such light to a second point that is separated from the first point along an axis transverse to a surface of the chiral lens. Such step is performed upon transmitting the light, having a polarization represented by a combination of first and second mutually orthogonal polarizations, through an embodiment of the article of manufacture as identified above.

Embodiments additionally provide a method that is performed with an implementation of the article of manufacture configured as a bi-focal spin-multiplexed optical imaging system employing a combination of the chiral lens and the primary lens, as identified above, and that includes a step of forming, in an imaging plane defined by such optical imaging system, both first multiple images of a first portion of an object space (and only with the use of a first component of light incident onto such combination from the object space) and second multiple images of a second portion of the object space (and only with the use of a second component of the light incident onto said combination from the object space). Here, the first component has the first state of polarization and the second component has the second state of polarization that is orthogonal to the first state of polarization. In at least one specific case, such method may additionally include a step of transmitting the light incident onto the combination from the object space through a two-dimensional array of spatially-limited material elements each of which is configured as a half-wave plate for each of the first state of polarization and the second state of polarization (such two-dimensional array being disposed transversely to an optical axis of the combination) and/or the steps of (i) forming the first multiple images with the use of only substantially a half of a first fraction of the light incident onto the combination from the object space that has the first state of polarization while converging the other half of the first fraction to a first plane different from the imaging plane, and (ii) forming the second multiple images with the use of only substantially a half of a second fraction of the light incident onto the combination from the object space that has the second state of polarization while converging the other half of the second fraction to a second plane different from the imaging plane. Additionally or in the alternative, the method may satisfy, when the light incident onto the combination from the object space is substantially monochromatic, a condition of substantially not overlapping any of the first and second multiple images with one another by transmitting such light through the primary lens of the combination that has an F-number that is not smaller than an F-number of the chiral metalens of the combination. Substantially every embodiment of the method may further effectuate—with the use of a programmable processor, operably cooperated with an optical detector located at the imaging plane—(i) the step of transforming optical images acquired by the optical detector to determine a spatial characteristic and/or a spectral characteristic of an auxiliary portion of the object space that is not optically conjugate with the imaging plane based at least on values of a point spread function (PSF) of the bi-focal optical imaging system empirically that have been determined at multiple wavelengths for a multiplicity of different object distances for each of the first and second states of polarization; and/or (ii) the step of determining such spatial and/or spectral characteristic of the auxiliary portion of the object space that is separated from the combination by a distance within a range spanning at least five orders of magnitude or longer.

BRIEF DESCRIPTION OF THE DRAWINGS

The invention will be more fully understood by referring to the following Detailed Description of Specific Embodiments in conjunction with the Drawings. Notably, since the Drawings address optical imaging at different spectral wavelengths and contain complex images that aggregate sub-images at several of such distinct wavelengths required to be presented in color, the skilled artisan will better appreciate the disclosure with these Drawings being color Drawings. Accordingly, the patent or application file contains at least one drawing executed in color. Copies of this patent or patent application publication with color drawing(s) will be provided by the Office upon request and payment of the necessary fee.

FIG. 1A illustrates, with the use of three sub-figures, a concept of a photonic spin-multiplexed metalens array. The unit cell of metalens array is composed—in one specific case—of rectangle amorphous $TiO_2$ nanopillar sitting on a $SiO_2$ substrate with $P_x=P_y=450$ nm, and height h=600 nm.

FIGS. 2A, 2B, 2C address empirically acquired, with the use of photonic spin-multiplexed metalens arrays, light intensity distributions. Focal spots in the x-y and x-z plane for an LCP incident light at 530 nm (FIG. 2A) and an RCP incident light at 530 nm (FIG. 2B). For ease-of-viewing, an array of 12×12 focal spots (top left sub-graph in each of FIGS. 2A and 2B) is presented. The solid white lines illustrate the horizontal profiles of the intensity distributions in focal spots. FIG. 1C: Dispersion of a single sub-metalens of the array illustrated by spot distributions of light at different wavelengths spanning from 460 nm to 700 nm as focused by such metalens and registered by a photodetector. Here, the incident light was linearly polarized.

FIG. 3A: A conceptual sketch of such light-field imaging camera. FIG. 3B: A schematic diagram of the working principle of the system with a metalens array configured to implement spin-dependent bifocal light-field imaging. Either of or both of the LCP component of generally unpolarized light emanating from a closely located object (near portion of the object space) or the RCP component of such generally unpolarized light from a distant object (a far portion of the object space) are properly optically imaged on the same imaging plane that remains optically conjugate to the corresponding portions of the object space in corresponding light. In one specific case: —the nominal distance between the primary lens and the metalens array is, in one specific case, about L=47.5 mm; —the nominal distance between the pre-determined imaging plane and metalens array is about l=0.83 mm; —the focal length and aperture size of the primary lens are F=50 mm and D=6 mm, respectively. FIG. 3C: The captured PSFs at different depths for LCP, RCP, and UP (unpolarized) incident light. FIG. 3D: Demonstration of working range for different polarization states. The light blue region and light red region represent the working range of LCP and RCP component, respectively. The vertical axis represents the PSF ranks, for which the smaller value corresponds to better imaging quality. The uncertainties are standard deviation for repeated measurements (six in total).

FIG. 4A, FIG. 4B, and FIG. 4C illustrate an embodiment of a processing flow of an embodiment of the neural network-based reconstruction algorithm utilized in at least one embodiment. FIG. 4A: Point spread function (PSF) capture and training data generation. FIG. 4B: Aberration removal with the use of an implementation of a multi-scale deep convolutional neural network. The distance between the primary lens and Matryoshka nesting dolls, as imaged: 0.3 m, 0.5 m, 1.0 m, 1.5 m, 2.3 m, 3.3 m. The insets show the nearest and farthest Matryoshka nesting dolls. FIG. 4C: Light-field processing based upon the retrieved all-in-focus light-field images, including disparity estimation and refocusing images at different depths.

FIGS. 5A, 5B, and 5C illustrate a process of evaluation of spatial resolution of an embodiment of a light-field imaging system structured according to the discussed idea. FIG. 5A: Captured sub-images of an USAF 1951 resolution chart at different depths of field. For easy recognition, the 3×3 sub-images are shown. FIG. 5B: Aberration-corrected sub-images. FIG. 5C Top: Rendered center-of-view images of the USAF 1951 resolution chart. Bottom: Zoom-in images and intensity cross-sections of each smallest resolvable line pair in the resolution chart.

FIGS. 6A, 6B, 6C, 6D, and 6E address experiment results obtained with an embodiment of the light-field imaging system with extreme DOF. FIGS. 6A, 6B: Captured light-field sub-images of the whole scene under natural light before (FIG. 6A) and after (FIG. 6B) correction for aberrations. FIGS. 6C, 6D: Zoomed-in sub-images of different objects (portions of the object space) corresponding to the marked ones shown in FIG. 6A and FIG. 6B, respectively. FIG. 6E: Aberration-corrected all-in-focus image of the object space after rendering. The reconstructed NJU characters have been reasonably shifted and scaled for easy viewing.

FIG. 8 contains four sub-plots, FIGS. 8A, 8B, 8C, and 8D that respectively illustrate simulated transmission coefficients (red $|t_x|$; green $|t_y|$) for x- and y-polarized light and phase difference (blue, $\Delta\varphi$) between these two polarized light components over the majority of the visible spectral range (here, from about 460 nm to about 700 nm) for the nanostructures #1, #2, #3, and #4 identified in FIG. 7.

FIG. 9 includes sub-FIGS. 9A, 9B, 9C and provides schematic illustration to characterization of an implementation of achiral metalens array, structured according to the discussed idea. FIG. 9A: Experimental setup for focal spot measurements. A collimated beam of light is passed through a polarizer and quarter-wave plate to generate circularly polarized light. FIGS. 9B, 9C: Measured focal lengths. The uncertainties are standard deviation for repeated experimental measurements (four in total).

FIG. 11A: The relationship between L+a and the object distance A. FIG. 11B: The PSF rank distribution with different focal length of meta-lens at different object distances. Note that here the object distance is shown in log scale.

FIG. 13 contains sub-FIGS. 13A, 13B, and 13C, and provides the schematic of an embodiment of the disparity estimation method for use in an embodiment. FIG. 13A: The overall disparity extraction pipeline. FIG. 13B: Illustration of the cost volume calculation method among two sub-images. FIG. 13C: the cost volume calculation of multi-view stereo matching algorithm.

FIG. 15 includes sub-FIGS. 15A and 15B illustrating an embodiment of the overall imaging system (compare with FIG. 3A) FIG. 15A: a schematic of the prototype bifocal light-field imaging system with a relay sub-system. Note that for clarity, for each object ('butterfly' or 'tree', as shown here), only light of that particular chirality in which a given object is optically imaged at the image sensor plane is plotted out. FIG. 15B: Image of the proposed prototype light-field camera system and the inset shows a practically implemented chiral metalens array.

FIG. 16 includes sub-FIGS. 16A, 16B. FIG. 16A: The imaging scheme for determining a PSF of the nearest (in this specific case) portion of the object space, at 3 cm distance. Note that when the pinhole is right at the front end of the main (primary) lens, the distance between the pinhole and the aperture of the main lens is 3 cm. FIG. 16B: The imaging scheme for determining a PSF of the farthest portion of the object space, at infinity, with the collimator.

FIG. 18 includes sub-FIGS. 18A through 18F. FIGS. 18A, 18B: Imaging of a portion of the object space at 3 cm distance, which is right at the front-end of the primary lens. FIGS. 18C, 18D: Imaging of a portion of the object space located at infinity, through a collimator. FIGS. 18E, 18F: The aberration corrected light-field and center-view rendered USAF1951 image at infinity.

FIG. 20 includes sub-FIGS. 20A, 20B, and 20C, each of which contains a column of three images. The rendered center-of-view images obtained in an LCP light, FIG. 20A; in a RCP light, FIG. 20B; and in natural light, FIG. 20C without applying an embodiment of the aberration correction algorithm. The images in red and green wireframes show the magnified distant scene and close scene, respectively. The white Chinese characters 'future' on the rooftop are about 360 m away and the ruler is placed at the depth of 0.35 m. The smallest scale of the ruler is 1 mm. The reconstructed NJU characters have been reasonably shifted and scaled for easy viewing.

Figure 1C:
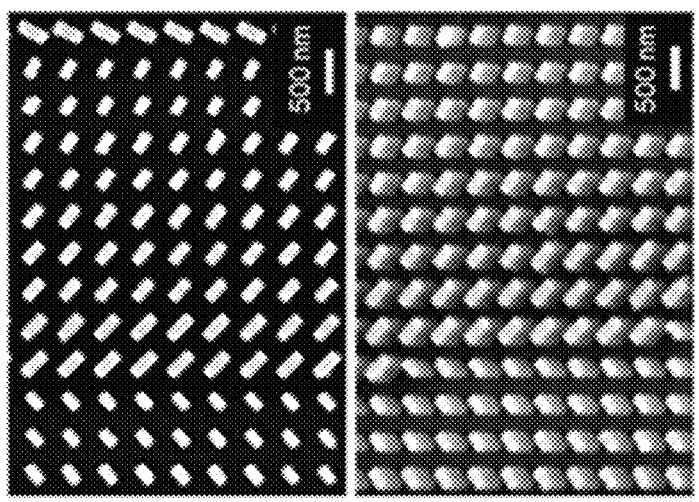
FIG. 1C: The scanning electron microscopy (SEM) images show the top view and oblique view of the $TiO_2$ nanopillars.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

The discussed embodiments demonstrate implementations of a specifically structured chiral metalens—that is, a lens configured with the use of a metasurface to possess one or more focal lengths corresponding to interaction of such lens with light having a specific, different from others, state of polarization (that is, there exists unique one-to-one correspondence between a given of the multiple focal lengths of the chiral metalens and a state of polarization of light). When the embodiment of the proposed chiral metalens has multiple focal lengths, such chiral metalens may be referred to as a spin-multiplexed multifocal metalens. It was unexpectedly discovered that, based on the use of an array of spin-multiplexed bifocal metalenses, a light-field camera (interchangeably referred to herein as an LFC or apparatus) can be judiciously configured to capture high-resolution light-field images over a incomparably larger—as compared with that of related art—depth-of-field ranging over more than five orders of magnitude of (linear, axially measured) distances, from a centimeter scale to a kilometer scale, while at the same time simultaneously enabling macro- and telephoto modes in a snapshot (single, frame or exposure) imaging process. Moreover, by additionally leveraging a multi-scale convolutional neural network-based reconstruction algorithm, optical aberrations induced by the metalens of the overall apparatus are substantially eliminated, thereby significantly relaxing the design and performance limitations on metasurface optics.

While existing light-field cameras are capable of measuring a 4D representation of light that encodes color, depth, specularity, transparency, refraction and occlusion (see, for example, I. Ihrke, et al., Principles of light field imaging, *IEEE Signal Proc. Mag.* 33, 59-69, 2016), the skilled artisan will readily recognize that LFCs of related art simply are not equipped to operate in the space of optical imaging parameters identified above as characteristics of an embodiment. Depth of field (DOF) and spatial resolution are considered to be two important system parameters in light-field photography and/or optical imaging in general: the term DOF refers to the range of depths or distances in object space over which one can obtain a clear reconstructed image of the scene from various sub-images captured at the surface of the or optical detector of the optical detection system whereas the term spatial resolution corresponds to and is defined as the minimum resolvable spatial interval in the final rendered single-view image. Early designs of a light-field camera utilized a microlens array placed at the focal plane of the primary lens to project rays of light arriving from different directions towards a corresponding point on the sensor (optical detector) to form a sub-image. Each sub-image in this scheme is conventionally treated as an equivalent spatial point within the full imaging space, and while the camera can have a relatively large DOF, its spatial resolution remains nevertheless quite low. Another design of light-field camera involves placement of the microlens array slightly away from the focus plane of the primary lens to achieve a higher lateral resolution; this, however, is recognized to come at the expense of fewer number of resolvable directions and a reduced DOF (see A. Lumsdaine, et al., in *Proceedings of the IEEE International Conference on Computational Photography*, 1-8, 2009)). Recently, a multifocal micro-lens array, in which individual lenslets or lens elements with different focal lengths were spatially interlaced next to each other, was discussed to extend the DOF in light-field imaging (see C. Perwass, et al., Single-lens 3D camera with extended depth-of-field, *Proceedings of SPIE*, 8291, 829108, 2012)—however, such extension was also achieved at the substantial expense of spatial resolution. Therefore, achieving large DOF without compromising at least spatial resolution remains a challenge in light-field optical imaging.

Existing works on conventional optical imaging have been exploited to extend the depth-of-field through shrinking the size of the aperture of a conventional lens, include focal sweeping, wavefront coding, and stacking of transparent photodetectors. However, as the skilled person already knows, each of these methodologies necessarily and always have to make a compromise between imaging performance (e.g., light throughput, time resolution, color imaging capability, imaging fidelity) and achievable depth-of-field.

Turning now to discussion of embodiments at hand, the spin-multiplexed metalens array is devised that, when used in an plenoptic optical imaging apparatus, solves the deficiencies of related art. An implementation of the proposed spin-multiplexed metalens provides two completely decoupled from one another transmission modulations to a pair of orthogonal circular polarization inputs of light, and thus gains an unexpected by related art and operationally advantageous ability to simultaneously capture light-field information for both close and distant (with respect to the metalens array) ranges of distances (depths of field) while simultaneously maintaining high lateral spatial resolution. Consequently, as discussed below, light-field information over large DOF can be computationally reconstructed from a single, the only, exposure. Further, an implementation of a distortion correction neural network is then employed to eliminate the aberrations in a single-frame polychromatic image, which significantly relaxes the design and performance limitations on the used metasurface optics. As a result, the proposed optical imaging camera system (which may be interchangeably referred to herein as an optical imaging apparatus) that employs such spin-multiplexed metalens unexpectedly and advantageously gains the capability of achieving full-color light-field imaging with a continuous DOF ranging from (as evidenced by a specific practical implementation) about a centimeter to about 10 km or more (as demonstrated in one example—from about 3 cm to about 1.7 km) with spatial resolution that is close to and substantially equal to diffraction-limited resolution.

Figure 1B:
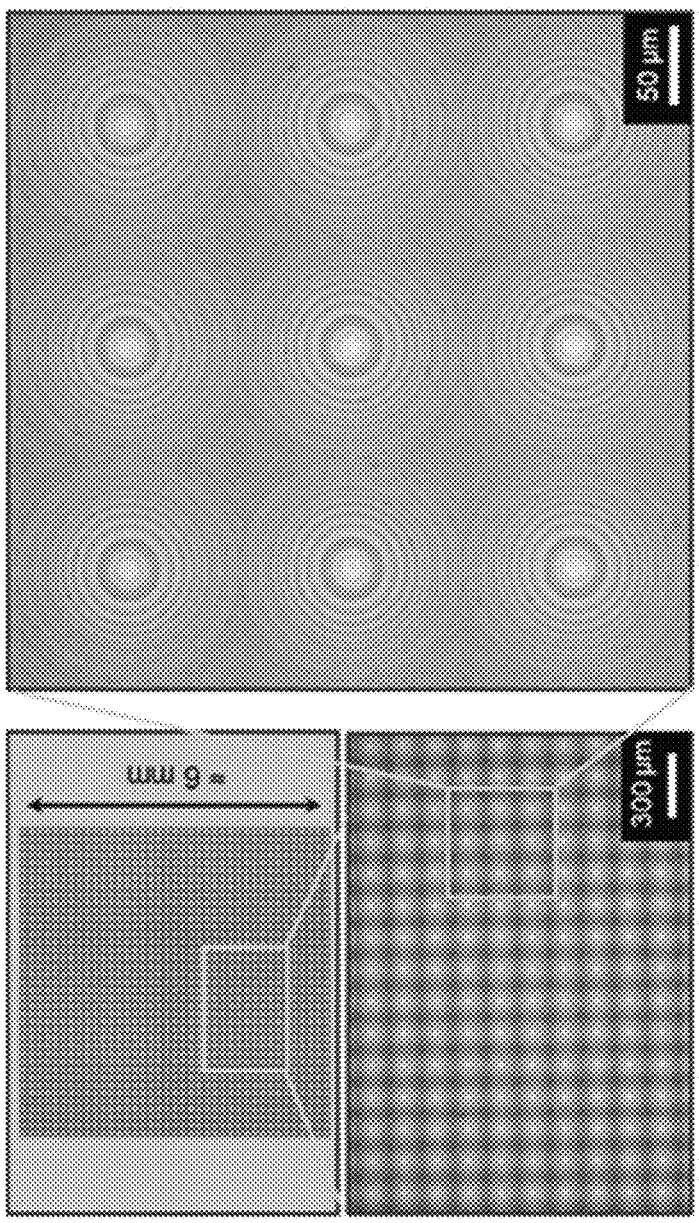
FIG. 1B with inset: An image of the fabricated metalens array acquired with optical microscope. Right panel (inset) shows a zoomed-in image of 3×3 sub-metalens array.

To this end, FIG. 1B provides the schematic diagram of a photonic spin-multiplexed metalens array, where each constituent metalens includes, in turn, an array of subwavelength surface features or elements. Such features or elements of the metasurface may be, in one non-limiting example, local modifications of the refractive index in a chosen optical substrate or—as discussed in the example presented below—nanopillars of an optical material (here, the discussion is presented based on the non-limiting example of $TiO_2$). For each constituent metalens of the array, the incident light (for example, non-polarized light) is assumed to be in two mutually orthogonal spin states:

$$|L\rangle = \begin{bmatrix} 1 \\ i \end{bmatrix} \text{ and } |R\rangle = \begin{bmatrix} 1 \\ -i \end{bmatrix},$$

where $|L\rangle$ and $|R\rangle$ denote left-circularly polarized (LCP) and right-circularly polarized (RCP) states, respectively. In order to achieve spin-multiplexed bifocality, the metasurface can be described by a Jones matrix $J(x,y)$ that simultaneously satisfies $J(x,y)|L\rangle = e^{i\varphi_l(x,y)}|R\rangle$ and $J(x,y)|R\rangle = e^{i\varphi_r(x,y)}|L\rangle$. Here, $\varphi_l(x,y)$ and $\varphi_r(x,y)$ denote two spin-dependent, uncorrelated phase profiles encoded on the metasurface to focus incident light at different focal lengths. Under these conditions, the Jones matrix $J(x,y)$ can be expressed as:

$$J(x, y) = \begin{bmatrix} e^{i\varphi_l(x,y)} & e^{i\varphi_r(x,y)} \\ -ie^{i\varphi_l(x,y)} & ie^{i\varphi_r(x,y)} \end{bmatrix} \begin{bmatrix} 1 & 1 \\ i & -i \end{bmatrix}^{-1} \quad (1)$$

and phase profiles $\varphi_l(x,y)$ and $\varphi_r(x,y)$ rely on the following form:

$$\varphi_{l,r}(x, y) = \frac{2\pi}{\lambda}\left(f_{l,r} - \sqrt{x^2 + y^2 + f_{l,r}^2}\right), \quad (2)$$

where $f_{l,r}$ denotes the desired focal lengths for the two polarization states, and $\lambda$ is the wavelength of operation. The analytical solutions extracted from the eigenvalues and eigenvectors of Jones matrix in Eq. (1) determine the required spatially varying propagation phase and geometric phase to be provided by each nanopillar of the metasurface. Therefore, in the specific case when it is $TiO_2$ nanopillars that are used as spatially limited material elements defining a metasurface, such nanopillars have optimized major (minor) axis lengths $D_x(D_y)$ and orientation angle ($\theta$) to form the requited, according to the current idea, spin-multiplexed metasurface. The details of $TiO_2$ nanopillar parameters and optical properties are provided elsewhere in this disclosure in Supplementary Information Section I, below.

For proof-of-concept demonstration, a 39×39 array of $TiO_2$ chiral metalenses was fabricated, with a fill-factor of substantially 100% achieved by close-packing individual square-shaped metalenses in a square lattice (FIG. 1C). Each metalens such array had a side-length d=150 µm and included about 110,000 $TiO_2$ nanopillars with rectangular cross-sections. Considering that the green channel in the Bayer filter array of a typical image sensor is twice as dense as the red channel or the blue channel, and taking into account the sensor's spectral sensitivity, the initial phase design of the metalens array was performed for green light at a wavelength of 530 nm. Two focal lengths, $f_l$=900 μm and $f_r$=1250 μm, respectively for incident LCP and RCP light at 530 nm, were judiciously chosen according to the targeted DOF of the overall LFC imaging system. FIG. 1D shows the scanning electron microscope (SEM) image of the fabricated $TiO_2$ chiral, spin-multiplexed bi-focal metalens. The top-view and perspective-view images evidence well-defined nanopillars exhibiting great fidelity. The detailed fabrication process is described in Methods and Materials section, below.

(A skilled person will readily appreciate that in a related embodiment, a spin-multiplexed multifocal metalens can be configured/dimensioned to operate on light characterized by a different set of mutually orthogonal states of polarization—in the simplest alternative case, a set of mutually orthogonal linear polarizations. Such alternative(s) remain within the scope of the present idea and its implementations.)

To characterize the optical performance of the fabricated embodiment of the metalens array, a collimated beam of circularly polarized laser light at a free-space wavelength of 530 nm was used to illuminate the metasurface at normal incidence. A schematic diagram of the measurement setup is shown in FIG. 9. As intended, the measured focal length of a constituent metalens of the metalens array was strongly dependent on the polarization of incident light. The focal lengths for LCP light and for RCP light were measured as $f_l$=(895±6) μm and $f_r$=(1243±9) μm, which agreed well with the design values. The uncertainty in focal length measurements was one standard deviation (SD) for repeated measurements. The light intensity distribution collected at two focal planes $f_l$ and $f_r$ are depicted in FIGS. 2A, 2B. From the normalized intensity distribution of the magnified single focused spot in x-y and x-z planes, the measured full-widths at half-maximum (FWHM) of focal spots for RCP light and LCP light were respectively (2.86±0.04) μm and (3.96±0.06) μm, which values are substantially close to the theoretical diffraction-limited FWHM of 2.83 μm and 3.92 μm, respectively. The uncertainty in the measurement of the FWHM is one standard deviation of the Lorentzian fit parameter.

As was experimentally demonstrated, the embodiment of a spin-multiplexed metalens array exhibited efficient chiral bifocality over a free-space wavelength range spanning from 460 nm to 700 nm, thereby evidencing the practical realization of broadband photonic spin-multiplexing in the visible portion of the optical spectrum. The chromatic dispersion of the embodiment of a constituent metalens of the array was substantially the same as that expected from a conventional diffractive optic, where the device exhibits wavelength-dependent focal shifts, as shown in FIG. 2C. The highest focusing efficiency, occurring at a center wavelength of 530 nm, was (58.3±1.5) % and (56.6±1.3) % for the LCP light and the RCP light, respectively, whereas the average efficiency over the entire bandwidth of (460 . . . 700 nm) was (43.6±1.6) % and (42.8±1.2) %, respectively for the two polarizations. The uncertainties in efficiency measurements were about one standard deviation for repeated measurements. Here, the focusing efficiencies were calculated as the ratio of the power passing through a 10 μm diameter pinhole around the focus formed by a metalens to the total power of incident light.

Understandably, the focusing efficiency of the implementation of a constituent metalens or the metalens array structured according to the proposed idea may be additionally improved, for example by optimizing the nanofabrication process and/or employing machine-learning to optimize the parameter space of nanostructure, including the dimensions of nanostructures, constituent material and lattice constant etc., one can potentially increase the efficiency. Notably, the implementation of the photonic spin-multiplexed metalens according to the discussed idea provides two completely decoupled wavefront modulations to a pair of mutually orthogonally circularly polarized light input and maintains the complete spatial frequency information when used in optical imaging, in stark contradistinction with spatially multiplexed multi-focal lenslets or lenses of related art (which simply cannot achieve such outcome due to the very nature of such lenslets). As a result, implementations of the discussed idea practically eliminate a trade-off between the depth-of-field and spatial resolution persisting in related art employing conventionally structured optics.

It is appreciated therefore, that discussed embodiments provide an article of manufacture that includes a chiral metalens containing an array of pluralities of spatially-limited material elements, in which array every plurality of the spatially-limited material elements is judiciously structured to converge a substantially planar wavefront of incident light to a first focal point for a first state of polarization and to a second focal point for a second state of polarization (here, the first and second states of polarizations are orthogonal to one another).

Based on the so-implemented chiral metalens, a metalens-based light-field imaging system was consequently realized. Construction of Metalens-Based Light-Field Imaging System.

Specifically, using the spin-multiplexed metalens array, a proof-of-concept light-field camera exhibiting extreme DOF and high spatial resolution, which in operation breaks or discards the trade-off between these two figures-of-merit that are well recognized in related art to limit the performance of a conventional light-field imaging system. In a current embodiment of the LFC, the DOFs corresponding to the two optical channels of the LFC (each channel utilizing and handling substantially only the light at one polarization of the two mutually orthogonal polarizations) are seamlessly connected, i.e., the far boundary of the DOF representing and corresponding to the optical imaging in the LCP light and the near boundary of the DOF representing and corresponding to the optical imaging in the RCP light are operationally connected with each other to form a substantially continuous aggregate DOF.

Figure 3A:
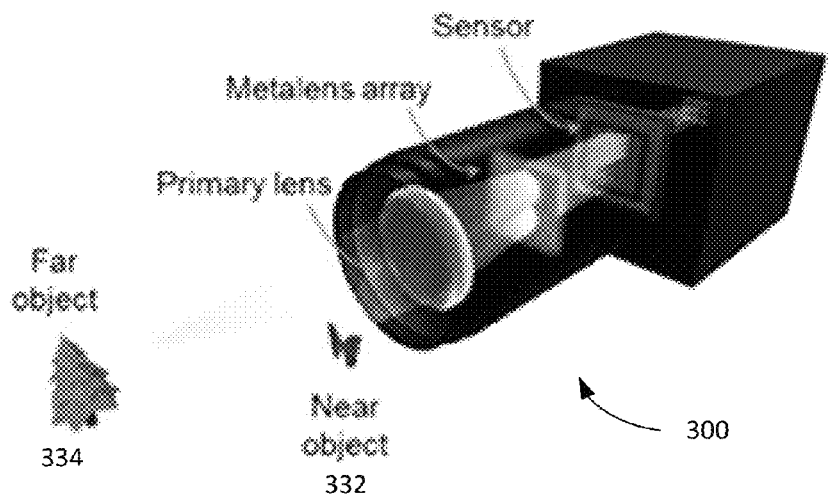
FIGS. 3A, 3B, 3C, and 3D schematically illustrate an embodiment of a light-field imaging system employing an implementation of a spin-multiplexed metalens array.
Figure 3B:
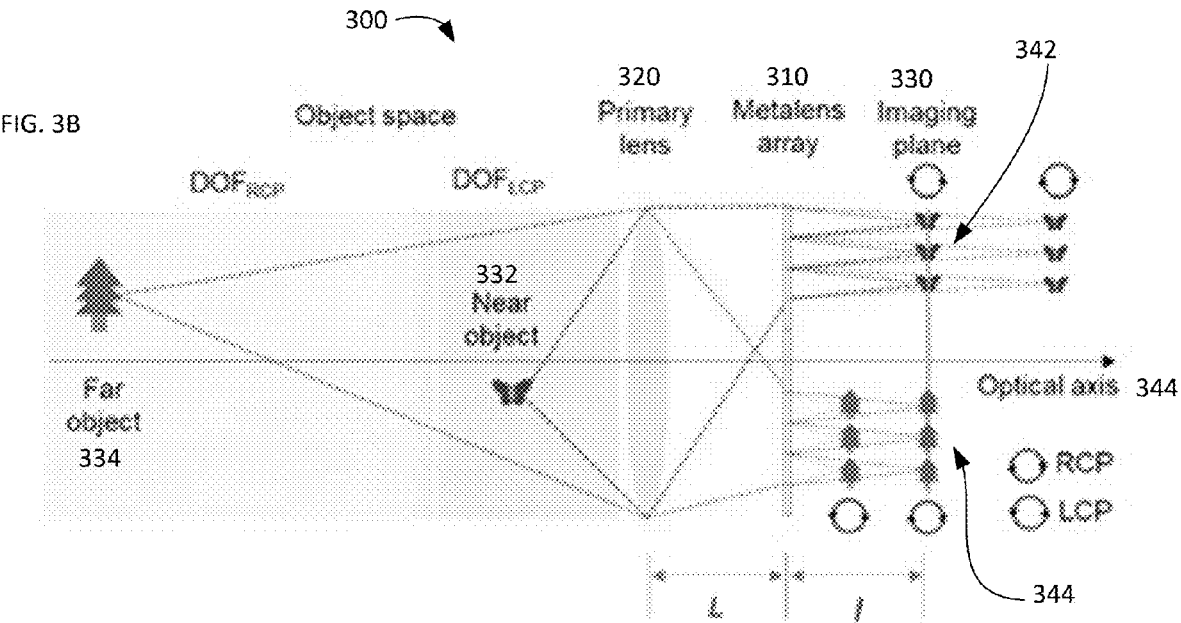

FIGS. 3A, 3B illustrate schematic diagrams depicting an embodiment of the plenoptic optical imaging apparatus 300 with the chiral metalens array 310 that is placed co-axially about the optical axis 314 behind the primary lens 320 (or a group of lens elements forming such a primary lens), to capture sub-images of the various scenes in the object space in front of the primary lens 320 and image them onto the imaging plane/sensor plane 330). For ease of illustration and understanding, the ray tracing of only monochromatic light is shown in FIG. 3B and the chromatic dispersion of the metalens array is ignored. As the skilled artisan will now understand, the operational focal length of the metalens can be simply "switched" between the values corresponding to two orthogonal states of polarization of light incident onto the primary lens by flipping the chirality of the incident light, thereby addressing a different DOF range in the object space. For a close object in the range of distances, from the PFC apparatus, corresponding to the depth range $DOF_{LCP}$, (here, shown as a "butterfly" 332 in FIG. 3B), the LCP component of light incident from the object space is well focused on the imaging plane by each of the constituent chiral lenses of the metalens array 310, thereby generating optically conjugate images 342 of such close object Conversely, for a distant object in the range of distances corresponding to the depth range $DOF_{RCP}$, (here, a "tree" 334 in FIG. 3B), it is the RCP component of the light incident from the object space that is focused on the imaging plane by the constituent metalenses of the array, thereby generating the respective optically conjugate images 344. Since light originating from most nature scenes is either unpolarized or partially polarized and can be decomposed into components having LCP and RCP states of polarization, the overall system 300 allows both close and distant portions of the object space to be simultaneously projected, focused and optically imaged on the imaging plane. The person or skill in the art will readily appreciate that the spin-multiplexed metalens array 310, enabling such capability of the apparatus 300, simply cannot be replaced by the multi-level diffractive optics or refractive optics due to the requirement of birefringence phase shifts and variable orientation angle at a subwavelength scale. The forward optical imaging process of the designed optical apparatus 300 can be modelled using the Rayleigh-Sommerfeld diffraction formula, Eq. (3):

$$U(x, y, z_i, \lambda) = \{[U(x, y, z_o, \lambda) * h(x, y, A, \lambda)] \cdot \Phi(x, y, \lambda) * h(x, y, L, \lambda)\} \cdot \varphi(x, y, \lambda) * h(x, y, l, \lambda)$$

where $U(x,y,z_o,\lambda)$ and $U(x,y,z_i,\lambda)$ are the complex amplitudes of the optical field at the object plane $z_o$ and image plane $z_i$, respectively, and $\lambda$ is the operation wavelength. $h(x,y,A,\lambda)$, $h(x,y,L,\lambda)$, and $h(x,y,l,\lambda)$ are the free-space propagation functions from a given object portion of the optical space to the primary lens 320, from the primary lens 320 to the metalens or the array 310, and from the metalens to the imaging plane 300, respectively. A, L and l denote the corresponding distances along the propagation (z) direction corresponding to the optical axis 314 (FIG. 3B). $\Phi(x,y,\lambda)$ and $\varphi(x,y,\lambda)$ are the phase profiles of the primary lens 320 and the metalens, respectively. The point spread function (PSF) is the response of an imaging system to a point source or point object. Using Eq. (3) above, the point spread function (PSF) of the proposed light-field imaging system 300 is calculated as:

$$PSF = \int H(\lambda) |U(x, y, z_i, \lambda)|^2 d\lambda \qquad (4)$$

To take the chromatic effect into account, here the PSF accumulates images of a point light source at different visible wavelengths. $H(\lambda)$ is the wavelength response function of the imaging system 300, which takes both the spectral response of the image sensor (optical detector) and the polarization conversion efficiencies of the selected nanostructure metalenses of the array 310 into consideration. Since PSF is the spatial version of the optical transfer function (OTF), the performance of the imaging system can be evaluated with a PSF rank metric $$PSF_{rank} = \sum_\omega \frac{\sigma^2}{|K_\omega|^2 + \frac{\sigma^2}{s_\omega}},$$

where $\sigma$, $\omega$, $K_\omega$, $S_\omega$ denote the noise level, spatial frequency, Fourier transform of the PSF, and the average power spectra of the captured image, respectively. A smaller value of the $PSF_{rank}$ corresponds to higher optical imaging quality. Using a $PSF_{rank}$ based metric, an optimal set of physical parameters within the limits of three design constraints of the optical system 300 can be chosen: (i) Focusing constraint: that the optical imaging system 300 be able to focus substantially at infinity; (ii) Repetitive rate constraint: that the repetitive rate of a scene from close to distant should be at least 3 for accurate disparity estimation; (iii) DOF touch constraint: that the DOFs corresponding to optical imaging in light portions having orthogonal polarizations (in the discussed example—LCP and RCP light chirality) should be seamlessly connected or axially stitched. Given the limited parameter space and PSF rank requirements for the imaging system, a set of eligible parameters are chosen for the optimized bifocal light-field camera (see Supplementary Information Section II, below).

Figure 3C:
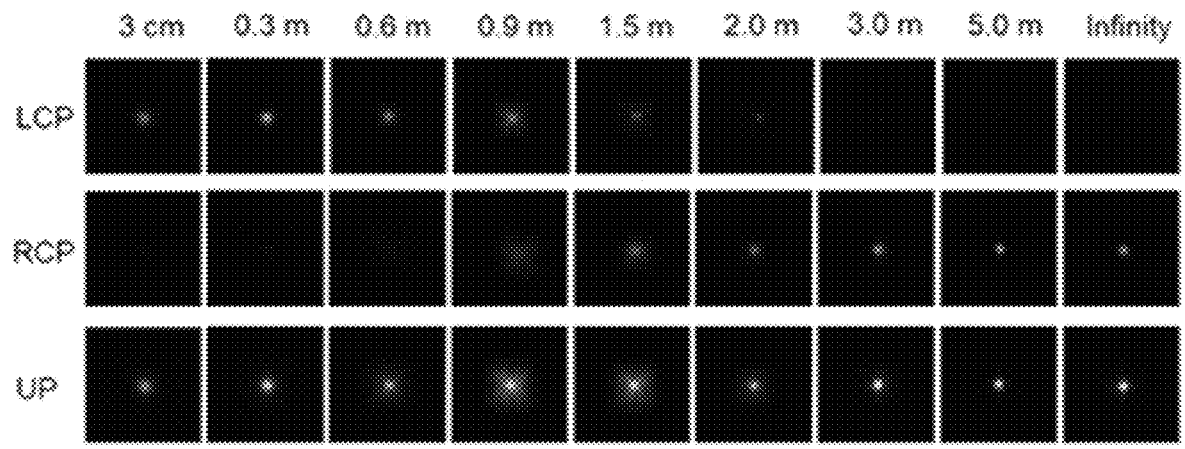

To validate the imaging performance of an embodiment 300 over an extremely large aggregate DOF, the PSF of the optical system of the apparatus 300 had to be measured first. To this end, a test target, made of a 100 μm diameter pinhole in an opaque film serving as a point light source, was illuminated with white light as such pinhole was gradually axially translated from a separation of about 3 cm from the front surface of the primary lens 320 to "infinity". Here the "infinity depth of field" (the "infinite object distance") was successfully approximated by collimating the white light emitted from a point source with the use of an optical collimator. As shown in FIG. 3C, under LCP illumination, the image of the point source is formed on the optical sensor (at the imaging plane 330) at the near DOF range while the far DOF range remain substantially out of focus (see the row "LCP" of images in FIG. 3C). Instead, when the polarization of the incident light was switched from LCP to RCP, the image of the point source was focused on the optical sensor at the far DOF range while the near DOF range remained out of focus (see the row "RCP" of image in FIG. 3C). By combining the two polarization channels, information about both close and distant objects can be simultaneously recorded on the imaging sensor (here, see the sequence of images displayed in FIG. 3C in the row "UP"—"unpolarized" light). Notably, the colors in the measured PSF images mainly originate from the inherent chromatic dispersion associated with the embodiment of a metalens.

Figure 3D:
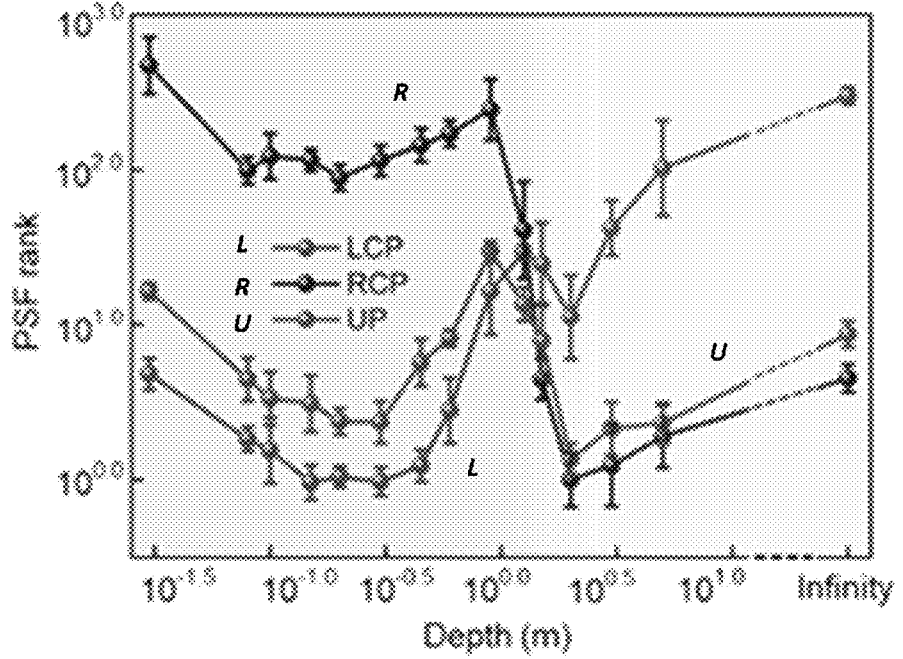

To quantify the performance of the imaging system, the $PSF_{rank}$ was evaluated according to the repeated measurement data (FIG. 3D). The $PSF_{rank}$ of the LCP channel (see curve labeled "L") exhibited a small value in the near DOF range (from about 3 cm to about 2 m), whereas the $PSF_{rank}$ of the RCP channel (see the curve labelled "R") became small for far DOF range (from about 2 m to infinity). As a result, when used in ambient environment with natural sources of light, the proposed light-field imaging system (the specific embodiment 300 of which is used here as a non-limiting example) is expected to have a relatively small $PSF_{rank}$ over an extremely large range of DOFs—see the curve labeled "U" (reaching from at least about a centimeter to at least 10 km or farther), which satisfies the imaging requirement.

Reconstruction Algorithm Based on Multi-Scale Convolutional Neural Network

The operation of the proposed metalens-based imaging system is likely a subject to various spatially non-uniform optical aberrations, mainly including chromatic and comatic aberrations introduced by the metalens. In addition, the location, depth and assembling errors of the optical system may lead to diverse aberrations in practice. In one embodiment, employed was an artificial neural network with all convolutional layers to eliminate these aberrations and generate a high-quality light-field image in a semi-blind way. The proposed method requires only a simple calibration process before training and achieves excellent robustness for the diversity and disturbance of aberrations and, in contradistinction with currently employed algorithms, not only corrects for severely non-uniform and diverse optical aberrations through reliable post-processing based on artificial intelligence and machine learning, but also significantly relaxes the design requirements on achromatic metasurface optics that incorporate sometimes hard-to-fabricate unit-cell architectures, and are still plagued by small aperture size and limited focusing efficiency.

Figure 4A:
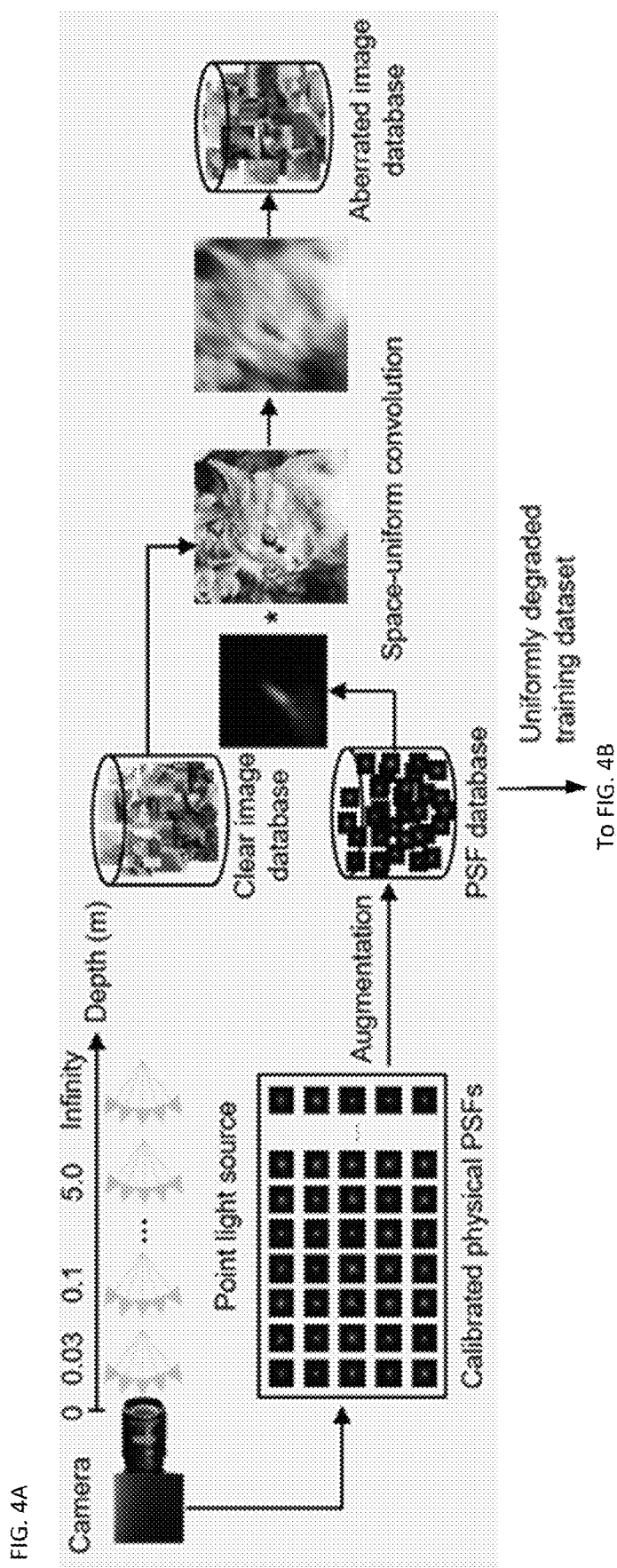
Figures 7, 7A, 7B, 7C, 7D:
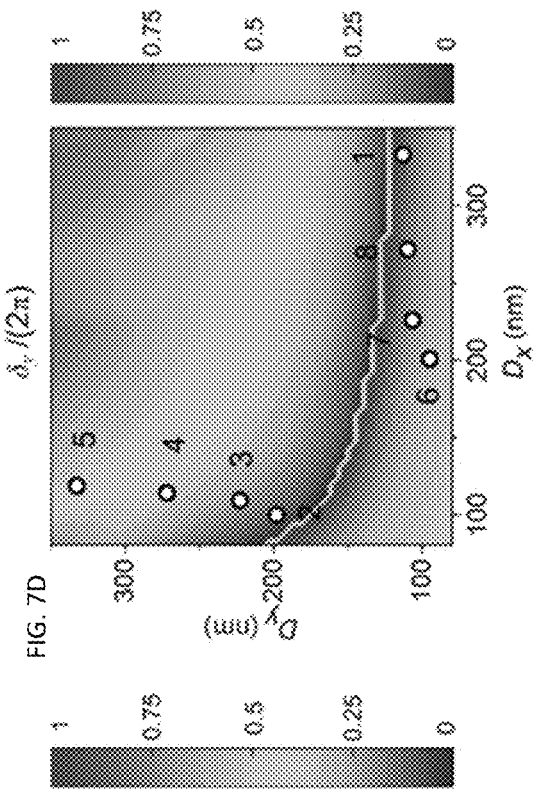
FIG. 7 includes sub-FIGS. 7A, 7B, 7C, and 7D. Here: Calculated intensity (FIG. 7A: $|t_x|^2$.
FIG. 7C: $|t_y|^2$) and phase shifts (FIG. 7B: $\delta_x$.
FIG. 7D: $\delta_y$) of transmission coefficients as a function of axis length ($D_x$, $D_y$) of the rectangular nanopillar at the wavelength of 532 nm are shown. The white dots indicate four fundamental nanostructures #1, #2, #3, and #4: #1 (335 nm, 120 nm), #2 (100 nm, 200 nm), #3 (110 nm, 225 nm), #4 (115 nm, 270 nm). By rotating the nanopillars by an angle of 90°, the other four mirror structures #5, #6, #7, and #8 can be obtained.

The processing flow of an embodiment of the proposed neural network-based reconstruction methodology is illustrated in FIGS. 4A, 4B. First, a set of training data is generated from the physically calibrated optical aberrations of the imaging system (FIG. 4A). To obtain the real optical aberrations of the system 300, various PSFs were empirically recorded using a pinhole at different depths (i.e., at different distances z between the aperture of the primary lens 320 and the object, as shown in FIG. 4A) and lateral positions. Based on the measured PSFs, a large PSF dataset was generated with a PSF augmentation method. Specifically, the PSFs calibrated at different locations and depths were randomly rotated and slightly resized to generate the sparse PSF basis, and generate the augmented PSF space through linearly combining the wavefront errors reconstructed from these sparse PSF basis using phase retrieval. The aberrated images for training were generated by uniformly convolving clear images with PSFs in the augmented PSF dataset. The aberrated and corresponding clear image pairs were then used to train the aberration correction neural network. Although the aberrations were substantially uniform for the training data, the entire training dataset contained various forms of aberrations. This enabled the neural network to autonomously handle the effects of different aberrations at any local subregion of a captured image or even other distortion in a chiral metalens system with transfer learning strategy.

Using the generated training data, a multi-scale convolutional neural network was built configured to correct aberrations and reconstruct an all-in-focus light-field image from the experimentally captured data (FIG. 4B). The neural network was composed of multiple branches of convolutional layers with different scales of effective receptive field, which could emulate biological neural processing and aggregate information from different scales (refer to FIG. S6 for network details). To verify the feasibility of the proposed method, an imaging scene composed of six colorful Matryoshka dolls placed at different z distances was experimentally designed. As is shown in the enlarged 3×3 insets of FIG. 4B, the original light-field images of Matryoshka dolls taken by the metalens array were blurry due to aberrations. Using the trained neural network, however, the aberration-corrected all-in-focus image retrieved at the output of the network appeared aberration-free and sharp (FIG. 4B). Besides the all-in-focus image, successive multidimensional light-field information can also be subsequently retrieved using light-field processing methods (see, for example, G. Wu, et al., Light field image processing: an overview, *IEEE J. Sel. Top. Sig. Process.* 11, 926-954, 2017).), such as disparity map and refocused images at different depths (FIG. 4C). Further details of light-field processing method including disparity estimation and rendering method are described in Supplemental Information Section III, below.

Benefiting from the multiscale convolutional architecture, as well as the sparse-PSF-calibration and PSF-space-augmentation strategy, the proposed method achieves promising performance for removing the intensely non-uniform and severely diverse aberrations in a semi-blind way without requiring additional PSF or location information after training. It was proven to be robust to the diversity of aberrations caused by the locations, depths, and assembling errors of the system in practice through training with the augmented PSF space.

Light-Field Imaging with Extremely Large Aggregate DOF.

Figure 19:
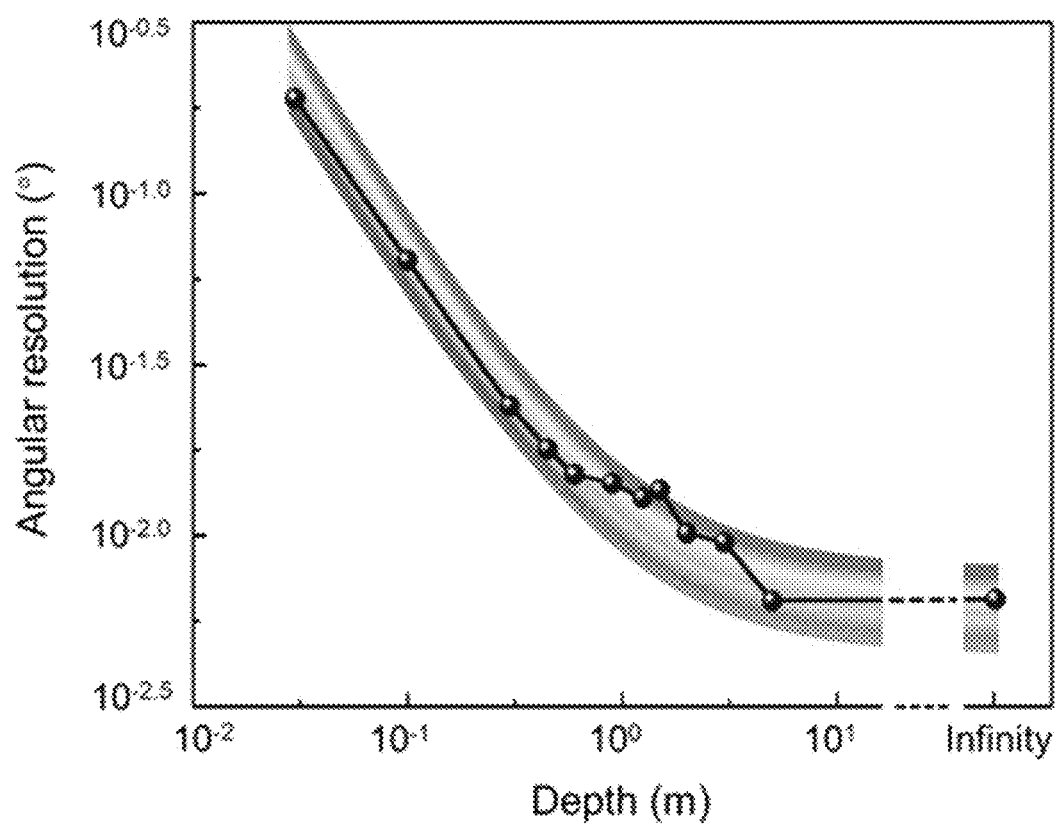
FIG. 19 illustrates the experimentally measured (shown with a plot) and theoretical (depicted with a rainbow region) angular resolution of an embodiment of the proposed light-field camera. Blue to red colors for theoretical results correspond to visible wavelengths.

To quantitatively evaluate the performance of the light-field imaging system 300 and related neural network algorithm, a USAF 1951 resolution chart was placed, as a target object, at several different distances (here, working distance from about 3 cm to about 5 m) away from the primary lens 320, and illuminated with white light. FIG. 5A shows the light-field (plenoptic) sub-images of the resolution chart captured by the optical detector without postprocessing, demonstrating quite low image quality. In contrast, as a result of applying an embodiment of the deep learning-based neural network correction and reconstruction algorithm discussed above, high-resolution and aberration-free sub-images (FIG. 5B) and reconstructed center-of-view image (FIG. 5C) could be achieved throughout the entire working distance. From the zoomed-in images and cross-sections shown in FIG. 5C, the smallest line pair that could be resolved were 5.04 lp/mm (group 2, element 3) and 0.89 lp/mm (group 1, element 6) at 3 cm and 5 m, respectively. According to these rendered images of the resolution chart, the corresponding angular resolution of the specific implementation 300 of the proposed metalens array-based LFC as a function of depth was calculated (see Supplementary FIG. 19). Benefiting from the elegant reconstruction, the resolution of imaging system matches well with the theoretical diffraction-limited ones calculated across the visible wavelength.

To better exhibit the capability of light-field imaging over extremely large DOF with the use of the proposed imaging system 300 and the proposed reconstruction algorithm, an object scene covering an enormous depth range from 3 cm to 1.7 km was chosen, in one specific experiment. Here, a piece of glass patterned with opaque characters 'NJU' was placed at a depth of 3 cm away from the aperture of the primary lens 320, which was used as the nearest object. A ruler, a color plate, and a university logo were placed at the depth (separation distance) of about 0.35 m, about 2 m, and about 10 m, respectively. The distances to white Chinese characters on the rooftop and dormitory building were approximately 360 m and 480 m, respectively. The distance to the farthest highrise was approximately 1.7 km. FIGS. 6A and 6B show the captured light-field sub-images under natural light before and after neural network aberration correction, respectively. As expected, the proposed light-field imaging system 300 enabled in-focus imaging of both near and far objects. From the zoomed-in sub-images, it is clearly seen that the blurry effects (FIG. 6C) originating from the optical aberrations induced by the metalens array can be eliminated with the proposed aberration correction neural network (FIG. 6D). As a result, by further using the proposed embodiment of a reconstruction algorithm, a clear and sharp image of the whole scene could be obtained, covering a record depth range from 3 cm to 1.7 km (FIG. 6E). The results demonstrate that an embodiment of the proposed nanophotonic light-field apparatus employing the computational post-processing not only can achieve full-color imaging with extreme DOF, but also be able to eliminate the optical aberrations induced by the meta-optics. More experimental results about light-field imaging under the LCP and RCP light are given and analyzed in Supplementary Information Section IV, below.

Methods

Nanofabrication of a Metalens Array.

A fused silica substrate was spin-coated with a layer of 600 nm thick, positive electron beam resist. The chiral metalens was defined in resist using an electron beam lithography system. This process was performed at a beam current of 2 nA and accelerating voltage of 100 kV. Then, the patterned resist was coated with a layer of $TiO_2$ at a temperature of 90° C. using atomic layer deposition (ALD). The over-coated $TiO_2$ film was etched by employing an inductively-coupled-plasma reactive ion etching (ICP-RIE) in a mixture of $Cl_2$ and $BCl_3$ gas. Finally, the sample was soaked in n-methyl-2-pyrrolidone to remove the resist.

Characterization of a Metalens Array.

The experimental setup for measuring the focal spot of chiral metalens array is given in supplementary FIG. 9A. Here, a collimated laser beam was passed through a polarizer and quarter-wave plate to generate circularly polarized light. The wavelength of laser was selected by using acousto-optic tunable filter system (AOTF). The microscope employed a 100× objective with a numerical aperture (NA) of 0.8 to capture the intensity distribution of focal spots. The measured focal lengths for LCP and RCP light are shown in supplementary FIGS. 9B, 9C.

SUPPLEMENTARY INFORMATION

I. Design of a Chiral Metalens Array

Simulation of Individual Birefringent Nanopillars

According to Eq. (1) above, the embodiment of a chiral metalens can be described by Jones matrix J(x,y) as:

$$J(x, y) = \frac{1}{2}\begin{bmatrix} e^{i\varphi_l(x,y)} + e^{i\varphi_r(x,y)} & ie^{i\varphi_r(x,y)} - ie^{i\varphi_l(x,y)} \\ ie^{i\varphi_r(x,y)} - ie^{i\varphi_l(x,y)} & -e^{i\varphi_l(x,y)} - e^{i\varphi_r(x,y)} \end{bmatrix} \quad (S1)$$

where $\varphi_l(x,y)$ and $\varphi_r(x,y)$ denote two spin-dependent, uncorrelated phase profiles for the metasurface to converge incident light to different focal distances. By solving the eigenvectors and eigenvalues of the Jones matrix J(x,y) for orthogonal circular polarization states, one can obtain spatial birefringent phase shifts $(\delta_x, \delta_y)$ of the nanopillars as:

$$\delta_x(x, y) = \frac{\varphi_l(x, y) + \varphi_r(x, y)}{2}, \quad (S2)$$

and $$\delta_y(x, y) = \frac{\varphi_l(x, y) + \varphi_r(x, y)}{2} - \pi, \quad (S3)$$

and the rotation angle θ of the nanopillars as:

$$\theta(x, y) = \frac{[\varphi_l(x, y) - \varphi_r(x, y)]}{4}. \quad (S4)$$

Therefore, what is needed is to identify a set of birefringent nanostructures with appropriate major/minor axis length ($D_x$ and $D_y$) and orientation angle (θ) that satisfy the required phase to be encoded by the spin-multiplexing metasurface. The first task is to perform a parameter sweep and establish a library that determines the relation between birefringent phase shifts $(\delta_x, \delta_y)$ and lateral dimensions of a nanostructure. The simulations are implemented by using a finite-difference-time-domain (FDTD) method with horizontally and vertically polarized light illumination from the $SiO_2$ substrate side for a periodic array of anisotropic rectangular nanopillars made of $TiO_2$. FIGS. 7A through 7D show the calculated intensity and phase shifts of the transmission coefficients by varying the lateral dimensions of a $TiO_2$ nanopillar ranging from 80 nm to 350 nm. According to the Eqs. (S2-S4), a subset of nanopillars is chosen as the basic building blocks for the metalens.

The focusing efficiency of the designed photonic spin-multiplexed metalens depends on the polarization conversion efficiencies of selected nanopillars. Therefore, the nanostructures are chosen to maintain high transmission amplitudes for the two orthogonal linear polarizations, and simultaneously provide a phase difference of π between them. Theoretically, the polarization conversion efficiencies for RCP incident light and LCP incident light are identical. FIGS. 8A through 8D show the transmission coefficients for both polarizations, and their phase difference over wide range of visible wavelengths spanning from 460 nm to 700 nm. These selected nanostructures lay a foundation for the design of high efficiency and broadband chiral metalens according to the presented idea II. Optical Imaging System Design 1. Physical Parameter Space

TABLE 1

Parameter space for the design of imaging system

| Symbol | Physical Definition |
|---|---|
| F | focal length of the primary lens |
| $f_l$ | focal length of the metalens array corresponding to LCP light component |
| $f_r$ | focal length of the metalens array corresponding to RCP light component |
| D | aperture size of the primary lens |
| D | size of the metalens |
| L | distance between primary lens and metalens array |
| L | distance between metalens array and imaging sensor |

2. Principle of Parameter Selection

In this section, formulated are the three constraints mentioned above: i.e., (i) Far/infinity focusing constraint: that the system is able to focus at infinity; (ii) Repetitive rate constraint: that the repetitive rate of scene from close to distant object should be at least 3 for disparity estimation. Here, the repetitive rate is defined by the repetitive number of captured sub-images of the same object point; (iii) DOF touch constraint: that the transition of DOF for LCP and RCP light chirality should be continuous. Then, the physical parameters that could meet all these constraints are defined.

Figure 10:
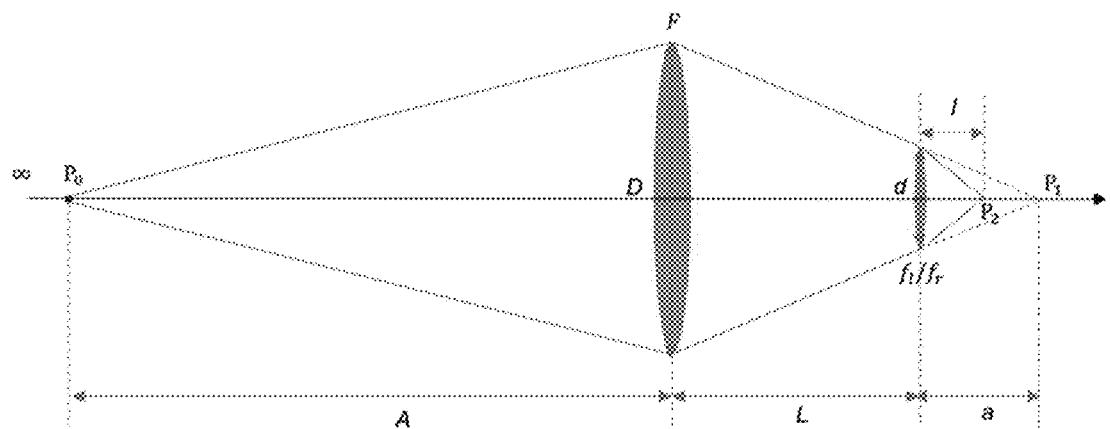
FIG. 10 provides a simplified geometric scheme of an embodiment of an imaging system. The object point $P_0$ is imaged by the primary lens to the image point $P_1$ (that is optically conjugate to $P_0$) and the image point $P_1$ is further re-imaged by the metalens to the image point $P_2$ (that is optically conjugate to $P_1$).

As shown in FIG. 10, the imaging process could be divided into two stages, i.e., the object point $P_0$ is first focused by the primary lens to $P_1$, and then $P_1$ is focused to $P_2$ by the embodiment of a chiral metalens. Here, the chiral metalens (in fact, the complete array of chiral metalenses in front of $P_1$. Based on a well-known assumption, for the first imaging stage, $$\frac{1}{A} + \frac{1}{L+a} = \frac{1}{F}, \quad (S5)$$

where A is the distance between $P_0$ and the primary lens, L+a is the distance between $P_1$ and the primary lens, and F is the focal length of the primary lens. For the second imaging stage, $$\frac{1}{-a} + \frac{1}{l} = \frac{1}{f_r}, \quad (S6)$$

where l is the distance between $P_2$ and the chiral metalens, a is the distance between $P_1$ and the metalens, and $f_r$ is the focal length of the RCP light chirality. The negative sign before a is introduced since the object and image points are on the same side of the metalens.

An off-the-shelf lens with F=50 mm and D=6 mm is chosen as a non-limiting example of the primary lens. With F chosen, the relationship between L+a and A becomes:

$$L + a = \frac{1}{\frac{1}{F} - \frac{1}{A}}. \quad (S7)$$

Figure 11A:
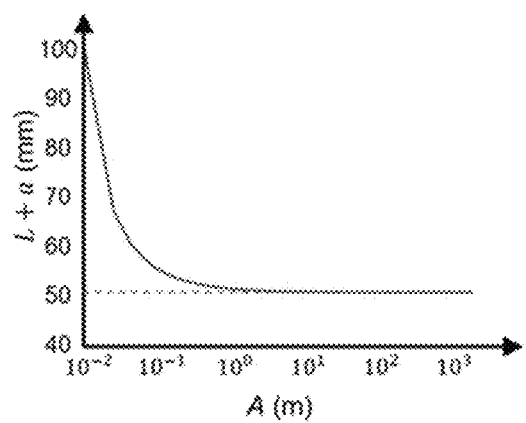
FIGS. 11A and 11B address the parameter chosen analysis of L+a and $f_l$.

The influence of A on the chosen of L+a is shown in FIG. 11A. From the figure, one could determine that when the focusing distance extends from 100 m to infinity, the value of L+a barely changes, staying at ≈50 mm. To meet the far/infinity focusing constraint, we set $$L + a = 50 \text{ mm}. \quad (S8)$$

To satisfy the repetitive rate constraint, the relationship between a and l is:

$$\frac{a}{l} = 3. \quad (S9)$$

Here, in a specific example, the size of a constituent chiral metalens d is chosen to be 150 μm.

For the embodiment of the process of light-field imaging discussed here, in order to avoid overlaps among sub-images, the F-number of the primary lens is defined to be no smaller than the F-number of the constituent chiral metalens of the array of chiral metalenses, i.e.

$$\frac{F}{D} \geq \frac{\max(f_r, f_l)}{d}.$$

Since the constituent metalens has two focal lengths that correspond to different light chirality and $f_r$ of the RCP channel is chosen as the longer focal length, the F-number of the primary lens is preferably no smaller than that of the constituent metalens of the RCP channel. Here, the following equation is used to match the F-numbers of the primary lens and metalens of the RCP channel:

$$\frac{F}{D} = \frac{f_r}{d}, \quad (S10)$$

With Eq. (S10), $f_r$ of the metalens for the RCP imaging channel is calculated to be 1.25 mm. Then the parameters of the imaging system except $f_l$ (the F-number of the metalens for the LCP imaging channel) can be derived by solving Eqs. (S5 to S9) jointly, i.e., $$l = \frac{2}{3}f_r \approx 0.83 \text{ mm}, a = 2f_r = 2.5 \text{ mm}, L = 50 \text{ mm} - a = 47.5 \text{ mm}.$$

Figure 11B:
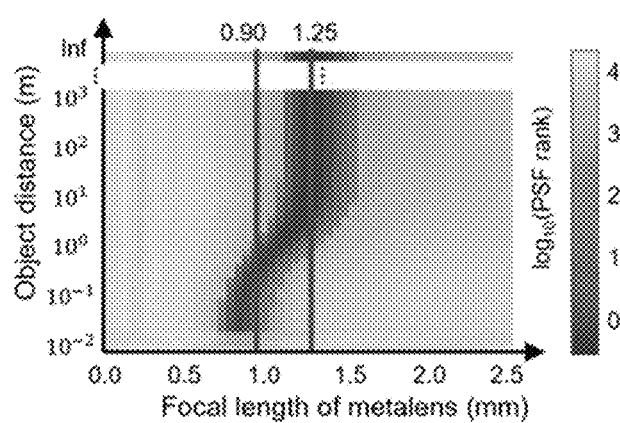

Thus far, the first two constraints are satisfied. To enable the system to focus at near objects under the DOF touch constraint, the remaining parameters $f_l$ of the metalens for the green color channel can be chosen, in one specific case, by analyzing the imaging quality with a series of possible focal length values, ranging from 0 mm to 2.5 mm, as one example. As shown in FIG. 11B, the $PSF_{rank}$ of the RCP channel ($f_r$=1.25 mm) exhibits a small value in the far depth range, whereas $PSF_{rank}$ of the LCP channel ($f_r$=0.90 mm) becomes small for near depth range. By the combination of these two DOFs from opposite light chirality, the DOF of our imaging system could theoretically be extended from 3 cm (i.e. ≈$10^{-1.5}$ m) to substantially infinity (or, in practical imaging terms, to at least 10 km). Notably, although the parameters as discussed are chosen with respect to the green channel, the introduced artifacts of the other wavelengths are necessarily resolved with the proposed embodiment of the aberration correction method. The physical parameters chosen for the light-field imaging system are listed in Table 2.

TABLE 2

The chosen parameters of the proposed light-field imaging system.

| Physical Parameters | Chosen Value (mm) |
|---|---|
| F | 50 |
| $f_l$ | 0.90 |
| $f_r$ | 1.25 |
| D | 6.00 |
| d | 0.15 |
| L | 47.5 |
| l | 0.83 |

III. Neural Network-Based Image Recovery Method

1. Complete Process-Flow of Light-Field Image Processing

Due to optical aberrations and coupling between the two polarization channels present in the proposed bifocal imaging system and the characteristics of light-field imaging, the captured light-field image suffers from much more severe spatially varying and diverse aberrations than traditional intensity imaging systems. Thus, instead of the widely used globally/locally deconvolution-based architectures, we propose a lightweight multiscale convolutional neural network, which works in a semi-blind and non-deconvolutional mode, to retrieve the clear images directly. A convolutional neural network trained on the images uniformly degraded by the various of PSFs enables its handling capacities for the intense non-uniform aberrations. To simplify the calibration and facilitate the robustness of the method for diverse aberrations, we span the PSF space from few calibrated PSFs of the imaging system by augmenting the PSFs in wavefront domain. Benefiting from the multiscale convolutional architecture and a sparse PSF calibration and augmentation strategy, the proposed method is able to adaptively remove the severe non-uniform and diverse distortions at different regions automatically without any additional information. After that, successive post-processing methods are implemented for disparity estimation and refocused image rendering.

2. Distortion Removal Neural Network

Figure 12:
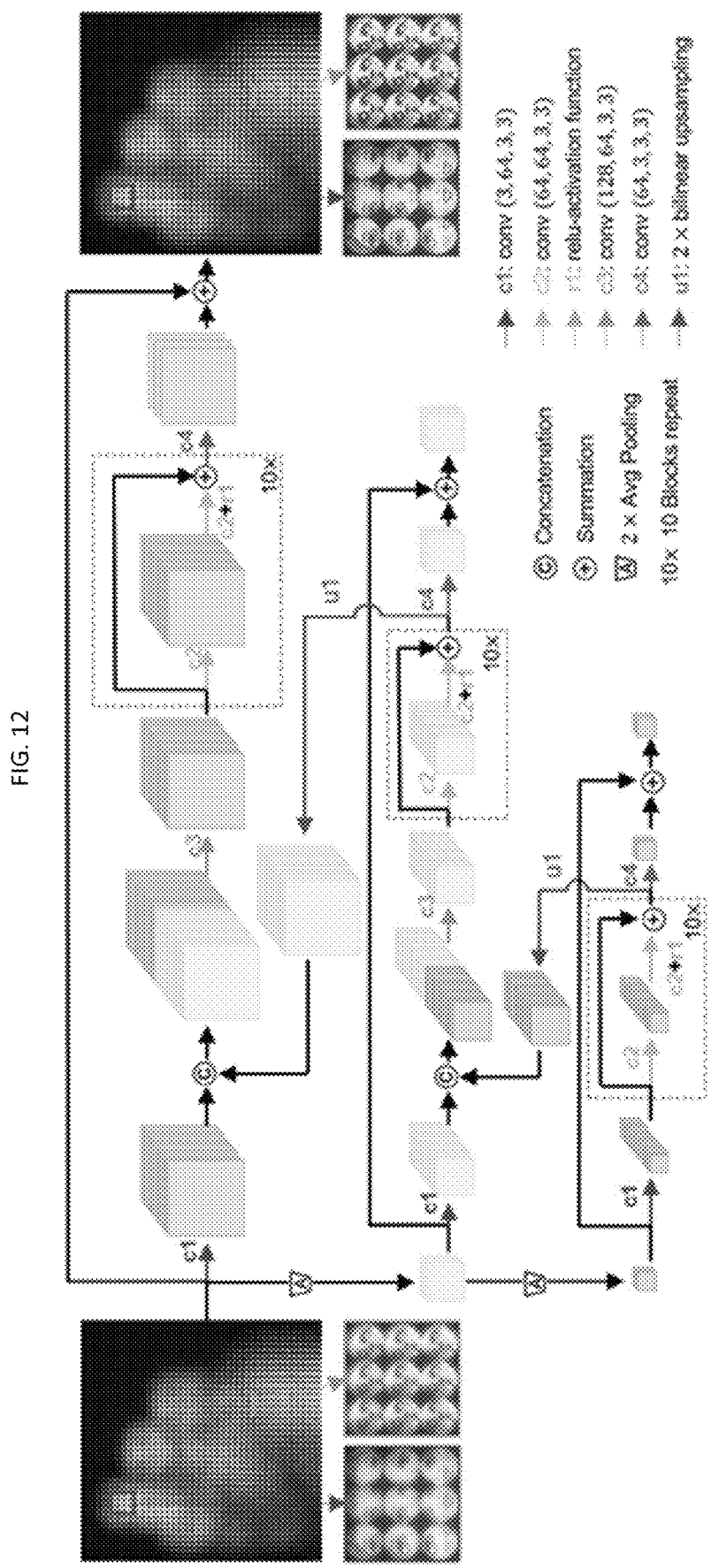
FIG. 12 illustrates architecture of an embodiment of the distortion removal convolutional neural network. The network includes 3 branches in different scales. Each branch of network is composed of residual blocks, convolutional blocks, skip connections. The features representing information of different scales are elegantly fused together with convolutions and concatenations among different network branches.

Network architecture: The proposed neural network combines the multi-scale structure, which is widely applied in various low-level computational tasks such as denoising, deblurring and super-resolution. The input signal is processed in a coarse-to-fine way with the multi-scale structure and the details of the network are shown in FIG. 12. Specifically, there are 10 res-blocks in each scale level. Each res-block contains 64 filters with convolutional kernel of size 3×3. Zero-padding is applied to keep the size of features. In addition, global connections are introduced between the input and output of each scale, which impels the network to learn the residual information of each scale.

Loss Function: We adopt the total loss combining the mean square error (MSE) and perceptual loss, i.e., $$L_{total} = \sum_{k=1}^{K} w_k \|G_k - O_k\|_2^2 + \lambda \|\phi_{vgg}(G_1) - \phi_{vgg}(O_1)\|_2^2, \tag{S11}$$

where $O_k$ and $G_k$ denote the output of network and ground truth image at scale level k. Each scale is weighted with $w_k$, which are set as 1, 0.7 and 0.5 from large to small scale in our experiments. The second part of the loss function is the perceptual loss of the original image scale, calculated with the extracted features of the first 25 layers of VGG19. The weight of perceptual loss $\lambda$ is empirically set to $2 \times 10^{-3}$.

Dataset: To generate the training data, we calibrated sparse PSFs of the system from 0.03m to infinity. In practice, the camera is fixed and place a point light source at different positions from 0.03m to 5m to capture the PSFs and calibrated the PSF at infinity with a collimator shown in FIG. 16. It could be found that there is no significant difference between PSF at 5m and infinity. With the PSF augmentation strategy, all PSFs in the extreme depth-of-field could be covered in the training dataset. Considering the central symmetry property of optical system and error of calibration, the captured PSF set is augmented by randomly rotating, scaling and channel exchanging. The size of each PSF is set as 51×51. Specifically, we rotate and slightly resize the PSFs calibrated at different locations and depths randomly to generate the sparse PSF basis, and linearly combine the wavefront errors reconstructed from these sparse PSF basis using phase retrieval. The augmented dense PSFs could be computed by transforming the generated wavefront errors using Rayleigh-Sommerfeld diffraction in Eq. (3). White Gaussian noise (with standard deviation from 0 to 5, bit-width of captured image is 8) is further added to the training data to improve the noise robustness of the network. The ground truth sharp images are generated from COCO dataset (52) by randomly sampling 10,000 ground truth images. The ground truth images are convolved with the calibrated PSFs to generate the distorted images and then cut them randomly into patches with pixel size of 224×224 to train the neural network.

Training: The network is implemented upon the Pytorch platform. The network is trained using the Adam optimizer with $\beta_1=0.9$ and $\beta_2=0.999$. The total number of training epoch is set to be 50. The learning rate is initially set to 104 within the first 25 epochs and decayed to $10^{-5}$ in the last 25 epochs. The batch size is set to 4. The whole training procedure takes ≈10 hours on a commercial graphics processing unit (GPU, GeForce RTX 2080), with 2.2 M parameters.

Testing: Currently, the trained neural network requires 266 G flops for inferencing a 512×512 image. Since currently the network is not optimized in terms of computational efficiency, higher efficiency for real-time light field imaging can be achieved by employing network acceleration methods, such as quantification, network pruning and specially designed efficient architectures.

3. Disparity Reconstruction Method

Based on the distortion corrected light-field image, we further extract the disparity information via multi-view stereo matching, as shown in FIG. 13A of FIG. 13. First, for two neighboring sub-images (FIG. 13B), a matching cost volume is calculated with the squared difference metric with respect to different possible disparities, which is further smoothed with a 3×3 average filter. Here the possible range of disparity is from 0 to the pixel number of sub-image. Based on this calculation approach, for each sub-image, 8 matching cost volumes are calculated with respect to its 8 different nearest neighbors (FIG. 13C). Then, the cost volume of sub-image is obtained by averaging these 8 cost volumes, and further regularized with a semi-global strategy and refined by graph-cut. Finally, the disparity of each pixel is determined by the smallest cost value of the pixel.

4. Light-Field Rendering Method

Figure 14:
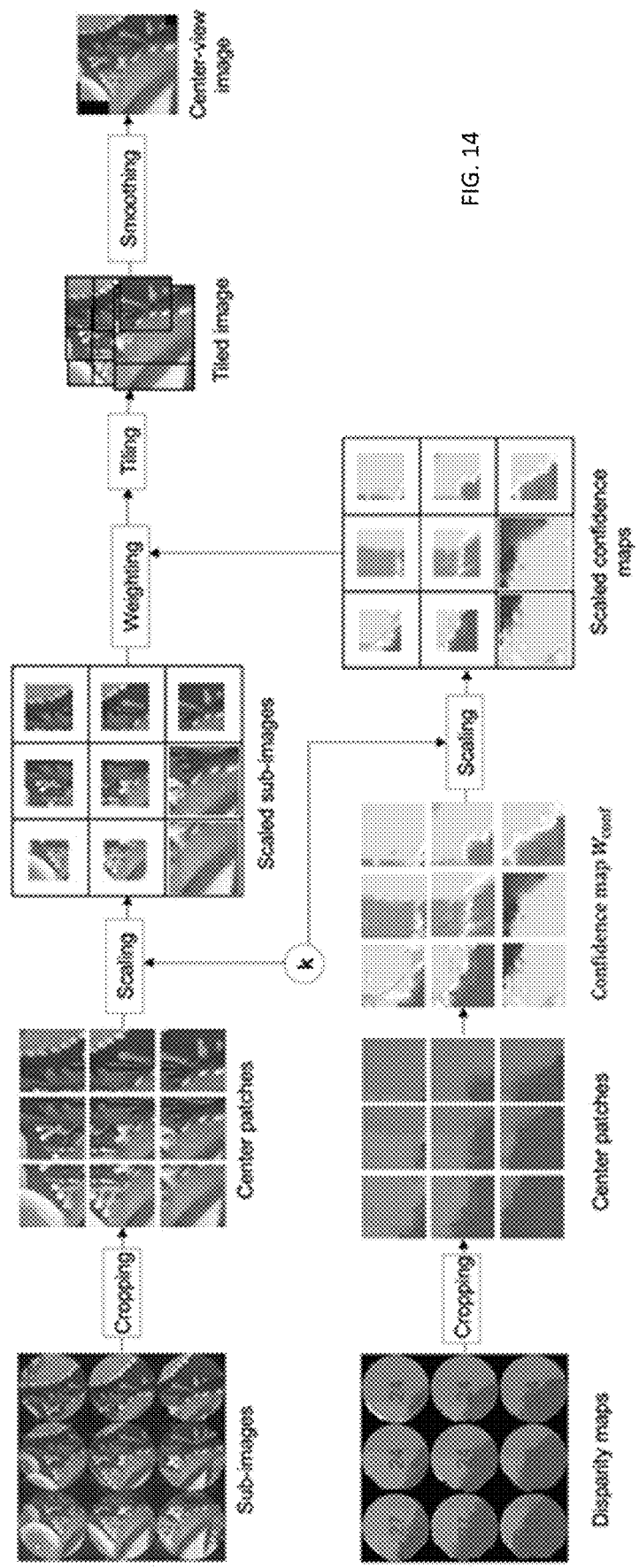
FIG. 14 provides a pipeline illustration of an embodiment of the rendering method. In this specific example, a 3×3 sub-images are acquired. Firstly, the center patch of each sub-image is extracted through cropping. Then the extracted patches are rescaled depending on the dominant disparity of each sub-image. Thirdly, the rescaled patches are weighted with the confidence maps calculated with the disparity map. Finally, the weighted patches are tiled together into a rendered center-view image.

The light-field rendering is implemented based on the framework described in, for example, T. Georgiev, et al., Focused plenoptic camera and rendering. *J. Electronic Imaging* 19, 021106 (2010). Center-view all-in-focus images are rendered in the following four steps: (1) extracting the center patch from each sub-image; (2) scaling extracted patches depending on the dominant disparity of each sub-image; (3) weighting the scaled patches with confidence maps; (4) tiling the weighted patches to a single image. The whole pipeline of the rendering method is illustrated in FIG. 14.

We first extract the center patch from each sub-image to eliminate the dark margin. Then we scale the patch based on its dominant disparity m with the scaling factor, $$k = \frac{d}{m}, \tag{S12}$$

where d is the patch size. With the scaling, the correspondences of different patches can be relocated to the same position.

To reduce the artifacts, we introduce a confidence weighting mask of each patch. The confidence of each pixel is inversely correlated with the difference between its disparity and the dominant disparity of the entire patch, $$W_{conf} = \max(e^{-C_1|m-disparity|}, C_2), \tag{S13}$$

where $W_{conf}$ is the confidence weighting mask, $C_1$,$C_2$ are both set to 0.1 in the experiments. After weighting the patches, we tile them together to get the final center-view image. To smooth the tiling artifact, a 2D Kaiser window is introduced to weight each patch. To generate refocused images at different depths, we introduce different Gaussian filters that correspond to different depths to blur each sub-images and generated the refocused images with the rendering method discussed above.

IV. Experimental Details

With the fabricated metalens array, one specifically dimensioned prototype bifocal light-field imaging system was built. The schematic and the prototype system are additionally shown in FIGS. 15A, 15B. The system included a commercial primary lens (focal length: 50 mm and aperture size: 6 mm), the designed metalens array ($f_l$: 0.90 mm, $f_r$: 1.25 mm, metalens size: 150 µm, 39×39 array of bifocal metalens) and a relay imaging system consisting of a 10× objective lens (Olympus RMX) and an imaging sensor (Grasshopper3 GS3-U3-41S4C). In addition, the experiment setups of capturing PSFs of object in the nearest position and infinity are shown in FIGS. 16A, 16B.

Figure 17:
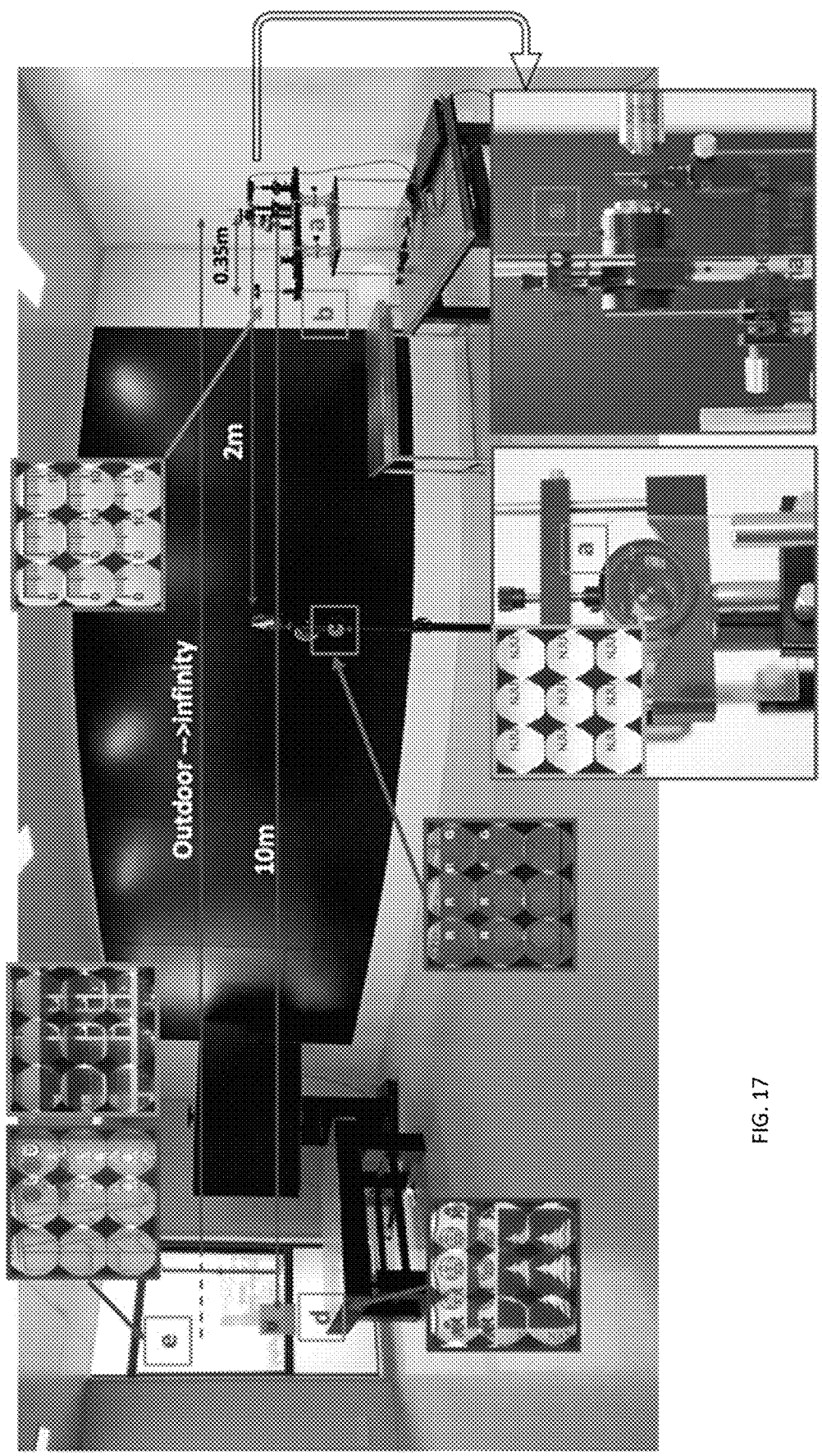
FIG. 17 provides an overview of the imaging scene of FIGS. 6A through 6D. The scene is composed of portions of the object space at different distances from the aperture of the primary lens, i.e., at 3 cm 'NJU' letters, at 0.35 m ruler, at 2 m color plate, at 10 m Nanjing University Logo, and also the outdoor scene.

FIG. 17 shows the imaging scene for capturing images of FIGS. 6A-6E. As shown, from nearest possible position at the front-end of the camera lens to a position at the far away houses, we were able to capture and reconstruct in-focus image of it. To further demonstrate the imaging capability of the proposed light-field imaging system. As shown in FIGS. 18A through 18F, additionally images of the resolution chart were acquired at different depths, i.e., from 3 cm to infinity. To simulate the infinity object, here we take the image of the USAF-1951 resolution chart at infinity distance with a collimator (FIGS. 18C, 18D). The aberration corrected light-field image and rendered center-view image of USAF1951 resolution chart at infinity are shown in FIGS. 18E and 18F, respectively. Notably, for object at infinity the spatial resolution is no longer meaningful a figure of merit and so the angular resolution was adopted to characterize the imaging performance. (The images captured at other distances are shown in FIGS. 5A, 5B, 5C). The corresponding angular resolution of the discussed embodiment of a metalens array-based camera with respect to depth of field was calculated and illustrated in FIG. 19. As shown, from about 3 cm to infinity, the resolution of the embodiment of the LFC apparatus matches well with the theoretical diffraction-limited ones calculated across the visible wavelength (illustrated in FIG. 19 by a "rainbow" region). These results further demonstrate the excellent imaging capability which has never been achieved before.

FIG. 20 (in sub-FIGS. 20A through 20C) shows the imaging results of the scene covering a depth (an axial separation distance between the front surface of the primary lens and a target portion of the object space) from 3 cm to 1700 m without aberration correction for the two polarization channels. For the LCP imaging channel, the camera can procure an in-focus image for the near objects, such as the 'NJU' string and ruler, but out-of-focus image for far objects (FIG. 20A). As expected, when the polarization state of light is switched from LCP to RCP, the system can obtain in-focus image for the far objects like color plate, university logo and buildings, but instead acquires the out-of-focus image for the near objects, i.e. the string and ruler (FIG. 20B). For operation in natural light, the camera can simultaneously obtain in-focused image for both near and far objects (FIG. 20B). The image in natural light is more blurred than that in a single polarization state due to cross-talk between two polarization imaging channels. However, since the cross-talk could be regarded as low-frequency noise added to the clear image, and could be eliminated with applying the aberration correction algorithm. Due to the limited field-of-view of the relay lens, captured were the 4×4 views and then tiled together to obtain the large field-of-view of image.

In accordance with the idea discussed above with the use of specific, non-limiting example(s), implementations of such idea include an optical imaging apparatus configured to image an object space and containing at least a chiral metalens (as defined) and an optical lens positioned substantially co-axially with a normal drawn to a surface of the chiral metalens. (The optical lens, understandably, may include multiple optical lens elements or lenslets). Here, the optical imaging apparatus is configured as a plenoptic imaging apparatus to provide a corresponding optical image of an object space for every object distance continuously ranging over a span of linear distances covering at least five orders of magnitude based on optical data acquired with a single image exposure through the combination of said chiral metalens and the optical lens. The optical apparatus may additionally include an optical detector positioned at a pre-determined image plane of the optical apparatus that is separated from the chiral metalens by a first fixed distance and from the optical lens by a second fixed distance, wherein each of the first and second fixed distances remains constant regardless of an object distance chosen within said span of distances. An embodiment may include a relay optics axially separated from the optical lens by the chiral metalens. Generally, the chiral metalens is configured to define, for light at each of the multiple wavelengths, a focal plane in a first state of polarization of light and a second focal plane in a second state of polarization of light that is orthogonal to the first state of polarization of light (in one specific but non-limiting case, the first and second states of polarization of light are states of linear polarization or, alternatively, the first and second states of polarization of light are states of substantially circular polarization). Substantially in every implementation of the optical imaging apparatus, each of individual constituent elements of the chiral metalens may be configured to operate as an optical half-wave plate for each of two mutually orthogonal states of polarization of light incident thereon and/or the chiral metalens may be configured as a metasurface in which each of the individual constituent elements includes a pillar of an optically-transparent material. Additional optional characteristics of an embodiment of the optical imaging apparatus are discussed above. For example, the imaging apparatus is preferably complemented with a computer processor operably cooperated with the optical detector of the apparatus and configured at least to transform an optical image acquired by the optical detector positioned in the pre-determined image plane to determine a spatial characteristic and/or a spectral characteristic of an auxiliary portion of the object space that is not optically conjugate with the pre-determined image plane based at least on values of a point spread function (PSF) of the optical imaging apparatus that has been empirically determined at multiple wavelengths for a multiplicity of different object distances for each of the first and second polarizations.

At least some of embodiments has been described as including a processor controlled by instructions stored in a memory (whether or not such processor is expressly indicated in the Figures). The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

Disclosure of each of the following publications is incorporated herein by reference: Loz BLAIN, "Record-breaking camera keeps everything between 3 cm and 1.7 km in focus" (available at newatlas.com/photography/nist-light-field-camera-record-depth-of-field/) and Qingbin FAN, et al., in Nature Communications. 13 (1): 2130 (available at nature.com/articles/s41467-022-29568-y). Additionally, the disclosure of each other publication cited elsewhere in this disclosure is incorporated herein by reference.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

A person of ordinary skill in the art will readily appreciate that references throughout this specification to "one embodiment," "an embodiment," "a related embodiment," or similar language mean that a particular feature, structure, or characteristic described in connection with the referred to "embodiment" is included in at least one of the discussed embodiments. Thus, appearances of the phrases "in one embodiment", "in an embodiment", and similar language throughout this specification may, but do not necessarily, all refer to the same embodiment. Accordingly—as the skilled artisan will readily appreciate—while in this specification the embodiments have been described in a way that enables a clear and concise specification to be written, it is intended that substantially none of the described embodiments can be employed only by itself to the exclusion of other embodiments (to the effect of practically restriction of some embodiments at the expense of other embodiments), and that substantially any of the described embodiments may be variously combined or separated to form different embodiments without parting from the scope intended for protection.

The expression "A and/or B" has a meaning that is "A alone, B alone, or A and B together".

Disclosed aspects, or portions of these aspects, may be combined in ways not listed above. Accordingly, implementations of the discussed idea should not be viewed as being limited to the disclosed embodiment(s). The recitations of the claims appended to this disclosure are intended to be assessed in light of the disclosure as a whole. Various changes in the details, steps and components that have been described may be made by those skilled in the art while observing the discussed principles.

What is claimed is:

1. An article of manufacture comprising:
   a chiral metalens including an array of pluralities of spatially-limited material elements,
      wherein every plurality of the pluralities of spatially-limited material elements is configured to converge a substantially planar wavefront incident thereon to a first focal point for a first state of polarization of said wavefront and to a second focal point for a second state of polarization of said wavefront, the first and second states of polarizations being orthogonal to one another, the first focal point being spatially different from the second focal point,
   and
   a primary lens axially separated from the chiral metalens and co-axial with the chiral metalens,
   wherein a combination of the primary lens and the chiral metalens is configured as a bi-focal light-field optical imaging system defining an image plane,
   wherein an F-number of the primary lens is not smaller than an F-number of the chiral metalens to avoid spatial overlap of multiple images at the image plane.

2. An article of manufacture according to claim 1, wherein the F-number of the primary lens is not smaller than the F-number of the chiral metalens that corresponds to a longer of a first focal length and a second focal length of said chiral metalens.

3. An article of manufacture according to claim 1,
   (a) wherein each of the spatially-limited material elements is configured as a half-wave plate for each of the first and second states of polarization and/or wherein each of the spatially-limited material elements is shaped as a pillar protruding from a surface of an optical substrate, and/or
- (b) wherein all of first focal points at which said substantially planar wavefront in converged are in a first focal plane and each of second focal points at which said substantially planar wavefront is converged are in the second focal plane, the first and second focal planes being substantially parallel to one another.

4. An article of manufacture according to claim 1, wherein:
- (a) a first structural condition is satisfied in that the primary lens includes more than one lens element, said more than one lens element being substantially co-axial with one another; and/or
- (b) a second structural condition is satisfied in that the article of manufacture further comprises a relay optics positioned at the image plane and configured to define a final image plane.

5. An article of manufacture according to claim 1, wherein:
- (a) said bi-focal light-field optical imaging system is configured to form in said image plane or,
- (b) when an auxiliary structural condition is satisfied in that the article of manufacture further comprises a relay optics positioned at the image plane and configured to define a final image plane, the relay optics is configured to form in said final image plane:
  first multiple images of a first portion of an object space only with the use of a first component of light incident onto the combination of the primary lens and the chiral metalens,
  and
  second multiple images of a second portion of the object space only with the use of a second component of the light incident onto said combination,
  wherein the first component of the light incident onto the combination has the first state of polarization and the second component of the light incident onto the combination has the second state of polarization and/or wherein the first portion of the object space and the second portion of the object space are necessarily different from one another.

6. An article of manufacture according to claim 5, wherein:
- (a) when the light incident onto said combination is substantially monochromatic,
  the first portion of the object space is optically conjugate with the image plane and is axially separated from the combination by a first distance while the second portion of the object space is optically conjugated with the image plane and is axially separated from the combination by a second distance, the first and second distances being necessarily different from one another, and/or
- (b) when the light incident onto said combination of the primary lens and the chiral metalens is substantially polychromatic,
  at least a part of the first portion of the object space and/or at least a part of the second portion of the object space is not optically conjugate with the image plane in light at one of multiple wavelengths present in the light incident onto the combination of the primary lens and the chiral metalens.

7. An article of manufacture according to claim 5, wherein the bi-focal light-field optical imaging system is configured to form said first multiple images with the use of only substantially a half of a first fraction of the light incident onto said combination that has the first state of polarization while converging the other half of said first fraction to a first plane different from the image plane, and
wherein the bi-focal light-field optical imaging system is configured to form said second multiple images with the use of only substantially a half of a second fraction of the light incident onto said combination that has the second state of polarization while converging the other half of said second fraction to a second plane different from the image plane.

8. An article of manufacture according to claim 7, wherein the first and second planes are axially separated from one another by the image plane.

9. An article of manufacture according to claim 5, wherein the bi-focal optical imaging system is configured to form said first and second multiple images in a single exposure of an optical detector of said bi-focal optical imaging system and necessarily without axial repositioning of an optical component of said bi-focal optical imaging system.

10. An article of manufacture according to claim 5, further comprising:
a programmable processor
- (a) that is configured to transform optical data acquired by an optical detector positioned in the image plane or, when the second auxiliary structural condition is satisfied, in the final image plane to determine a spatial characteristic and/or a spectral characteristic of a third portion of the object space that is not optically conjugate with the image plane based at least on values of a point spread function (PSF) of the bi-focal optical imaging system empirically determined at multiple wavelengths for a multiplicity of different object distances for each of the first and second states of polarization; and/or
- (b) that is configured to determine said spatial and/or spectral characteristic of the third portion of the object space that is separated from the combination of the primary lens and the chiral metalens by a distance within a range spanning at least five orders of magnitude or longer.

11. An article of manufacture according to claim 10, wherein a lower limit of said range is about a centimeter and/or an upper limit of said range is about 10 kilometers.

12. An article of manufacture according to claim 10, wherein the programmable processor is additionally configured:
to transform optical images represented by said optical data to correct said optical images for aberrations including at least third order aberrations and chromatic aberrations, and/or
to transform said optical images to estimate disparity thereof and/or to perform refocusing of said optical images at different depths of field, and/or
to transform said optical images by spatially stitching different of said optical images with one another,
thereby generating output images that are substantially fully focused for each depth of field corresponding to each distance in said range or generating output images selectively focused at specific depths of field corresponding to specific distances in said range or providing distance ranging functionality of said article of manufacture.

13. A method comprising:
upon transmitting of light, having a polarization represented by a combination of first and second mutually orthogonal polarizations, through the article of manufacture according to claim 1, converging a first portion of said light having the first polarization to a first point and converging a second portion of said light to a second point that is separated from the first point along an axis transverse to a surface of the chiral lens.

14. A method comprising:
with the use of an article of manufacture according to claim 1,
forming, in an image plane defined by a bi-focal spin-multiplexed optical imaging system that includes said combination of the primary lens and the chiral metalens,
  first multiple images of a first portion of an object space only with the use of a first component of light incident onto such combination of the primary lens and the chiral metalens from the object space,
  and
  second multiple images of a second portion of the object space only with the use of a second component of the light incident onto said combination of the primary lens and the chiral metalens from the object space,
  wherein the first component has the first state of polarization and the second component has the second state of polarization that is orthogonal to the first state of polarization.

15. A method according to claim 12, comprising:
transmitting the light incident onto the combination of the primary lens and the chiral metalens from the object space through a two-dimensional array of spatially-limited material elements each of which is configured as a half-wave plate for each of the first state of polarization and the second state of polarization, said two-dimensional array being disposed transversely to an optical axis of said combination of the primary lens and the chiral metalens.

16. A method according to claim 12, wherein said forming includes:
forming said first multiple images with the use of only substantially a half of a first fraction of the light that is incident onto the combination of the primary lens and the chiral metalens from the object space and that has the first state of polarization while converging the other half of said first fraction to a first plane different from the image plane, and
forming said second multiple images with the use of only substantially a half of a second fraction of the light that is incident onto the combination of the primary lens and the chiral metalens from the object space and that has the second state of polarization while converging the other half of said second fraction to a second plane different from the imaging plane.

17. A method according to claim 12, further comprising:
when said light incident onto the combination of the primary lens and the chiral metalens from the object space is substantially monochromatic, substantially not overlapping any of the first and second multiple images with one another by transmitting said light through the primary lens of the combination of the primary lens and the chiral metalens.

18. A method according to claim 12, further comprising:
with the use of a programmable processor, operably cooperated with an optical detector located at the image plane,
  (a) transforming optical images acquired by the optical detector to determine a spatial characteristic and/or a spectral characteristic of an auxiliary portion of the object space that is not optically conjugate with the image plane based at least on values of a point spread function (PSF) of the bi-focal optical imaging system that have been empirically determined at multiple wavelengths for a multiplicity of different object distances for each of the first and second states of polarization; and/or
  (b) determining said spatial and/or spectral characteristic of the auxiliary portion of the object space that is separated from the combination of the primary lens and the chiral metalens by a distance within a range spanning at least five orders of magnitude or larger.

* * * * *